US012545490B2

(12) United States Patent
Boersma et al.

(10) Patent No.: US 12,545,490 B2
(45) Date of Patent: Feb. 10, 2026

(54) CARRIER FOR CONTAINERS

(71) Applicant: Graphic Packaging International, LLC, Atlanta, GA (US)

(72) Inventors: Harmen Boersma, Heerenveen (NL); Ralf Mathei, Euskirchen (DE)

(73) Assignee: Graphic Packaging International, LLC, Atlanta, GA (US)

( * ) Notice: Subject to any disclaimer, the term of this patent is extended or adjusted under 35 U.S.C. 154(b) by 43 days.

(21) Appl. No.: 18/591,153

(22) Filed: Feb. 29, 2024

(65) Prior Publication Data

US 2024/0294319 A1 Sep. 5, 2024

Related U.S. Application Data

(60) Provisional application No. 63/449,146, filed on Mar. 1, 2023.

(51) Int. Cl.

*B65D 77/04* (2006.01)
*B31B 50/73* (2017.01)
(Continued)

(52) U.S. Cl.

CPC ........ *B65D 77/0453* (2013.01); *B31B 50/734* (2017.08); *B65D 1/243* (2013.01); *B65D 71/20* (2013.01); *B65D 71/32* (2013.01); *B65D 71/36* (2013.01); *B31B 2100/00* (2017.08); *B31B 2120/302* (2017.08); *B31B 2241/001* (2013.01); *B65D 2571/0016* (2013.01);
(Continued)

(58) Field of Classification Search

CPC .... B65D 77/0453; B65D 1/243; B65D 71/20; B65D 71/32; B65D 71/36; B65D 2571/0016; B65B 50/734; B65B 2120/302; B65B 2100/00; B65B 2241/001

USPC .......................... 206/427, 197, 493, 1.5, 784

See application file for complete search history.

(56) References Cited

U.S. PATENT DOCUMENTS 4,040,517 A * 8/1977 Torokvei ................ B65D 1/243 220/519

4,202,446 A 5/1980 Sutherland (Continued)

FOREIGN PATENT DOCUMENTS

| | | | |
|---|---|---|---|
| EP | 1 454 841 | B | 10/2009 |
| EP | 3 431 405 | A2 | 1/2019 |
| WO | WO 2021/212012 | A1 | 10/2021 |

OTHER PUBLICATIONS

International Search Report and Written Opinion for PCT/US2024/017789 dated Jul. 2, 2024.

*Primary Examiner* — Jacob K Ackun

(74) *Attorney, Agent, or Firm* — Andrew N. Claerbout; FisherBroyles, LLC

(57) ABSTRACT

A carrier for holding a plurality of containers includes a plurality of panels extending at least partially around an interior of the carrier, the plurality of panels including a plurality of side panels and at least one bottom panel foldably connected to a respective panel of the plurality of panels, locking features in the at least one bottom panel for at least partially maintaining a formed configuration of the carrier, and a plurality of system engagement features for at least partially receiving a portion of an outer container, each system engagement feature having a plurality of lines of weakening defining a plurality of separably connected sections in the at least one bottom panel.

65 Claims, 15 Drawing Sheets

(51) Int. Cl.

| | |
|---|---|
| ***B65D 1/24*** | (2006.01) |
| ***B65D 71/20*** | (2006.01) |
| ***B65D 71/32*** | (2006.01) |
| ***B65D 71/36*** | (2006.01) |
| *B31B 100/00* | (2017.01) |
| *B31B 120/30* | (2017.01) |

(52) U.S. Cl.
CPC .............. *B65D 2571/00277* (2013.01); *B65D 2571/00444* (2013.01); *B65D 2571/0045* (2013.01); *B65D 2571/0066* (2013.01); *B65D 2571/00716* (2013.01); *B65D 2571/00858* (2013.01); *B65D 2577/043* (2013.01)

(56) References Cited

U.S. PATENT DOCUMENTS

| | | | | |
|---|---|---|---|---|
| 5,423,420 | A | 6/1995 | Bakx | |
| 2010/0108544 | A1* | 5/2010 | Biundo .................. | B65D 71/10 206/511 |
| 2011/0204128 | A1* | 8/2011 | Hettinger ........... | B65D 71/0055 229/117.12 |

* cited by examiner

CARRIER FOR CONTAINERS

CROSS-REFERENCE TO RELATED APPLICATION

The present application claims the benefit of U.S. Provisional Patent Application No. 63/449,146, filed on Mar. 1, 2023.

INCORPORATION BY REFERENCE

The disclosure of U.S. Provisional Patent Application No. 63/449,146, filed on Mar. 1, 2023, is hereby incorporated by reference for all purposes as if set forth in its entirety.

BACKGROUND OF THE DISCLOSURE

The present disclosure generally relates to carriers or cartons for holding and displaying containers. More specifically, the present disclosure relates to carriers for holding and displaying containers and that include features for engaging an outer crate or outer container configured to hold a plurality of carriers.

SUMMARY OF THE DISCLOSURE

According to one aspect, the disclosure is generally directed to a carrier for holding a plurality of containers, the carrier comprising a plurality of panels extending at least partially around an interior of the carrier, the plurality of panels comprising a plurality of side panels and at least one bottom panel foldably connected to a respective panel of the plurality of panels, locking features in the at least one bottom panel for at least partially maintaining a formed configuration of the carrier, and a plurality of system engagement features for at least partially receiving a portion of an outer container, each system engagement feature comprising a plurality of lines of weakening defining a plurality of separably connected sections in the at least one bottom panel.

According to another aspect, the disclosure is generally directed to a blank for forming a carrier for holding a plurality of containers, the blank comprising a plurality of panels extending for at least partially around an interior of the carrier formed form the blank, the plurality of panels comprising a plurality of side panels and at least one bottom panel foldably connected to a respective panel of the plurality of panels, locking features in the at least one bottom panel for at least partially maintaining a formed configuration of the carrier formed from the blank, and a plurality of system engagement features for at least partially receiving a portion of an outer container, each system engagement feature comprising a plurality of lines of weakening defining a plurality of separably connected sections in the at least one bottom panel.

According to another aspect, the disclosure is generally directed to a method of forming a carrier for holding a plurality of containers, the method comprising obtaining a blank, the blank comprising a plurality of panels comprising a plurality of side panels and at least one bottom panel foldably connected to a respective panel of the plurality of panels, locking features in the at least one bottom panel, and a plurality of system engagement features, each system engagement feature comprising a plurality of lines of weakening defining a plurality of separably connected sections in the at least one bottom panel, and positioning the plurality of side panels extending at least partially around an interior of the carrier, and positioning the at least one bottom panel such that the locking features at least partially maintain a formed configuration of the carrier and such that the plurality of system engagement features are positioned for at least partially receiving a portion of an outer container.

According to another aspect, the disclosure is generally directed to a system, the system comprising an outer container comprising a bottom wall, a plurality of sidewalls extending upwardly from the bottom and at least partially around an interior of the outer container, and a plurality of posts extending upwardly from the bottom wall, and a carrier for holding a plurality of containers, the carrier comprising a plurality of panels extending at least partially around an interior of the carrier, the plurality of panels comprising a plurality of side panels and at least one bottom panel foldably connected to a respective panel of the plurality of panels, locking features in the at least one bottom panel for at least partially maintaining a formed configuration of the carrier, and a plurality of system engagement features at least partially receiving a respective post of the outer container, each system engagement feature comprising a plurality of lines of weakening defining a plurality of separably connected sections in the at least one bottom panel.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION

The present disclosure generally relates to carriers, packages, constructs, sleeves, cartons, or the like, for holding and displaying containers such as jars, bottles, cans, etc. The containers can be used for packaging food and beverage products, for example. The containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

In embodiments described herein, the containers can be beverage bottles, e.g., bottles formed of glass or metal, and having upper portions that include an at least partially tapered neck portion intersecting a flange that at least partially supports a cap. In other embodiments, the containers could be beverage cans or another suitable type and size of container.

Carriers according to the present disclosure can accommodate containers of numerous different shapes. For the purpose of illustration and not for the purpose of limiting the scope of the disclosure, the following detailed description describes beverage containers (e.g., glass bottles) at least partially disposed within the carrier embodiments. In this specification, the terms "lower," "bottom," "upper," "top," "front," and "back" indicate orientations determined in relation to fully erected carriers.

As described herein, cartons can be formed by multiple overlapping panels, portions, and/or end flaps. Such panels, portions, and/or end flaps can be designated in relative terms to one another, e.g., "first", "second", "third", etc., in sequential or non-sequential reference, without departing from the disclosure.

Figure 1:
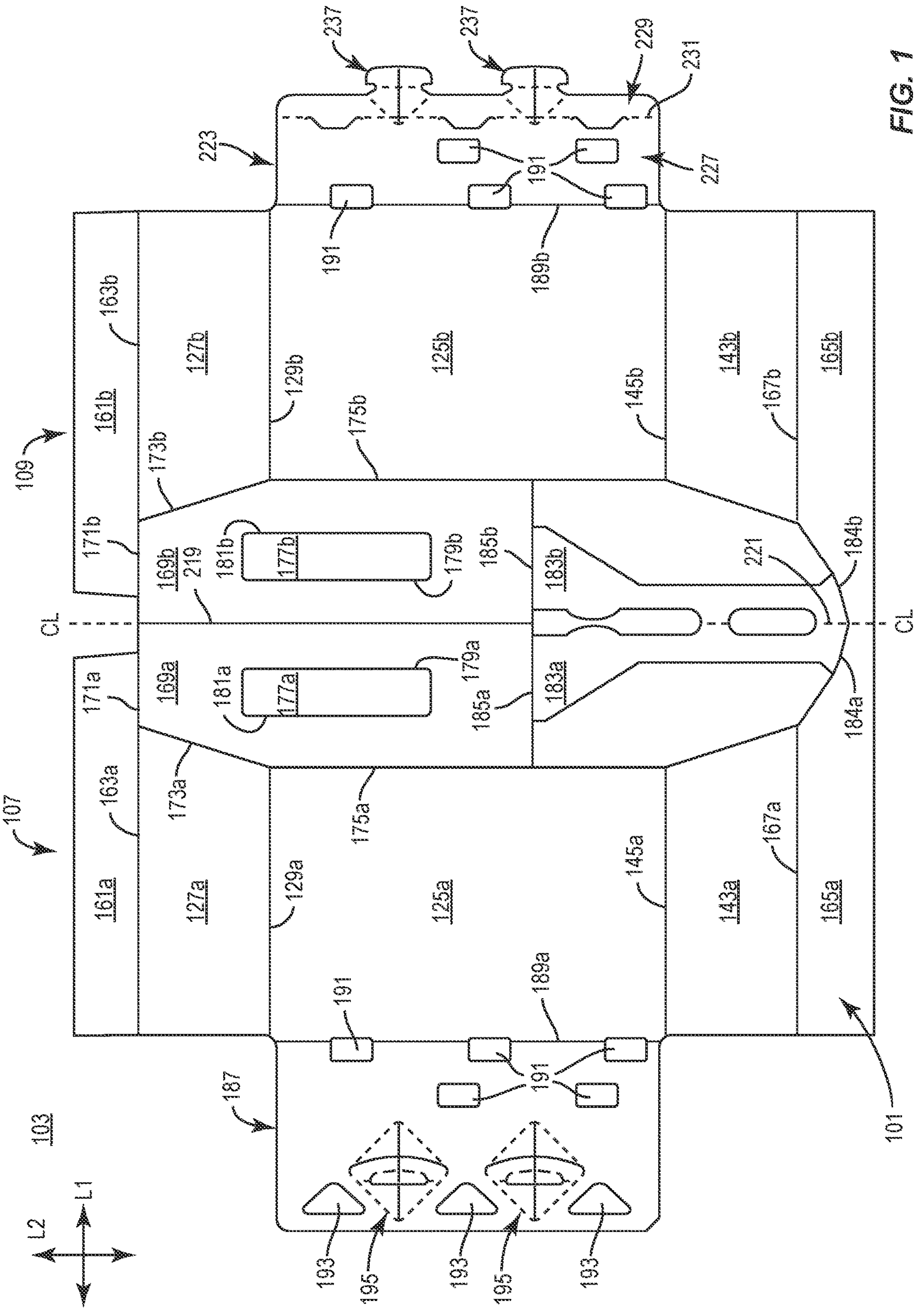
FIG. 1 is a plan view of an exterior surface of a blank for forming a carrier according to a first exemplary embodiment of the disclosure.
Figure 2:
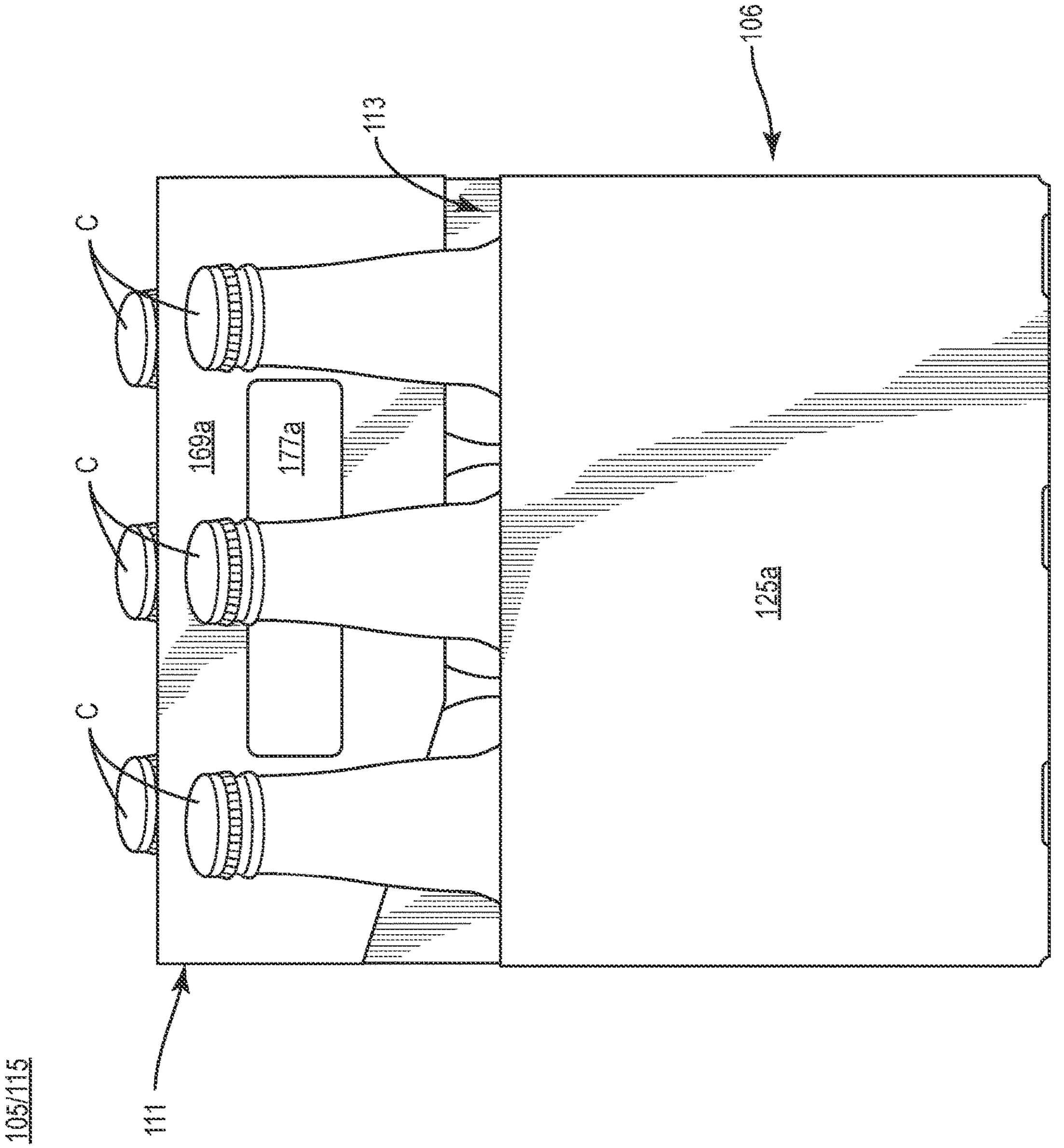
FIG. 2 is a perspective view of a carrier and package formed from the blank of FIG. 1 according to the first exemplary embodiment of the disclosure.

FIG. 1 shows a plan view of the exterior side 101 of a blank 103 used to form a package or basket-style carrier 105 (FIG. 2), in accordance with a first exemplary embodiment of the present disclosure. As shown in FIG. 2, the carrier 105 is sized to contain six containers C, three containers C being contained in a front portion 106 of the carrier 105 and three containers C being contained in a back portion 108 of the carrier 105.

The carrier 105 can be sized and shaped to hold more or less than six containers C. In some embodiments, the front portion 106 and the back portion 108 of the carrier 105 each have three containers C. In other embodiments, the front portion 106 and the back portion 108 of the carrier 105 can hold more or less than three containers C without departing from the disclosure.

As illustrated in FIG. 1, the blank 103 has a longitudinal axis L1 and a lateral axis L2. The blank 103 has a front portion 107 for forming the front portion 106 of the carrier 105, and a back portion 109 for forming the back portion 108 of the carrier 105. In one embodiment, the front portion 107 and the back portion 109 intersect at the lateral centerline CL of the blank 103, as shown. As discussed in further detail below, the blank 103 is at least partially formed into the carrier 105 by folding the blank 103 about fold lines 219, 221 along the centerline CL so that the front portion 107 and the back portion 109 of the blank 103 are overlapped in at least partial face-to-face contact.

In the illustrated embodiment, the front portion 107 of the blank 103 comprises a front panel **125*a* (broadly, "front side panel") and a first front side panel 127*a* (broadly, "first front end panel") foldably connected to the front panel 125*a* at a longitudinal fold line 129*a*. The front portion 107 of the blank 103 also includes a second front side panel 143*a* (broadly, "second front end panel") foldably connected to the front panel 125*a* at a longitudinal fold line 145*a***.

A first central panel or first keel **161*a*, as shown, is also foldably connected to the first front side panel 127*a* at a longitudinal fold line 163*a*. Similarly, a second central panel or second keel 165*a* can be foldably connected to the second front side panel 143*a* at a longitudinal fold line 167*a***.

As shown in FIG. 1, the front portion 107 of the blank 103 also includes handle features for forming a handle 111 of the carrier 105 and that include a front handle panel **169*a* foldably connected to the first keel 161*a* at a portion of a lateral fold line 171*a* that can be collinear with the fold line 163*a* and separated/separable from the first front side panel 127*a* at an oblique cut 173*a* that intersects a lateral cut 175*a* at which the front handle panel 169*a* is separably connected to the front panel 125*a*. In some embodiments, the lines 163*a*, 171*a*** can be segments of a single fold line.

A front handle flap **177*a*, as shown, can be foldably connected to the front handle panel 169*a* at a lateral fold line 179*a* and can be separably connected to the front handle panel 169*a* at a generally rectangular C-shaped cut line 181*a*. Further, a front handle reinforcement panel 183*a* can be foldably connected to the front handle panel 169*a* at a longitudinal fold line 185*a*. The front handle reinforcement panel 183*a* can be separably connected to the keel 165*a* at an oblique line of weakening 184*a***.

The front portion 107 of the blank 103, as shown in FIG. 1, can also include a front bottom end flap or a front bottom panel 187 foldably connected to the front panel **125*a* at a lateral fold line 189*a*. In the illustrated embodiment, the front bottom panel 187 can include a plurality of openings 191 positioned therealong, with some of the openings 191 interrupting the fold line 189*a***.

The front bottom panel 187 can also include a plurality of locking openings 193 for at least partially receiving locking tabs associated with the back portion 109 of the blank 103/back portion 108 of the carrier 105, as described further herein.

The front bottom panel 187 can also include system engagement features 195 for at least partially receiving one or more portions of an outer crate or other outer container for holding a plurality of carriers 105.

Figure 1A:
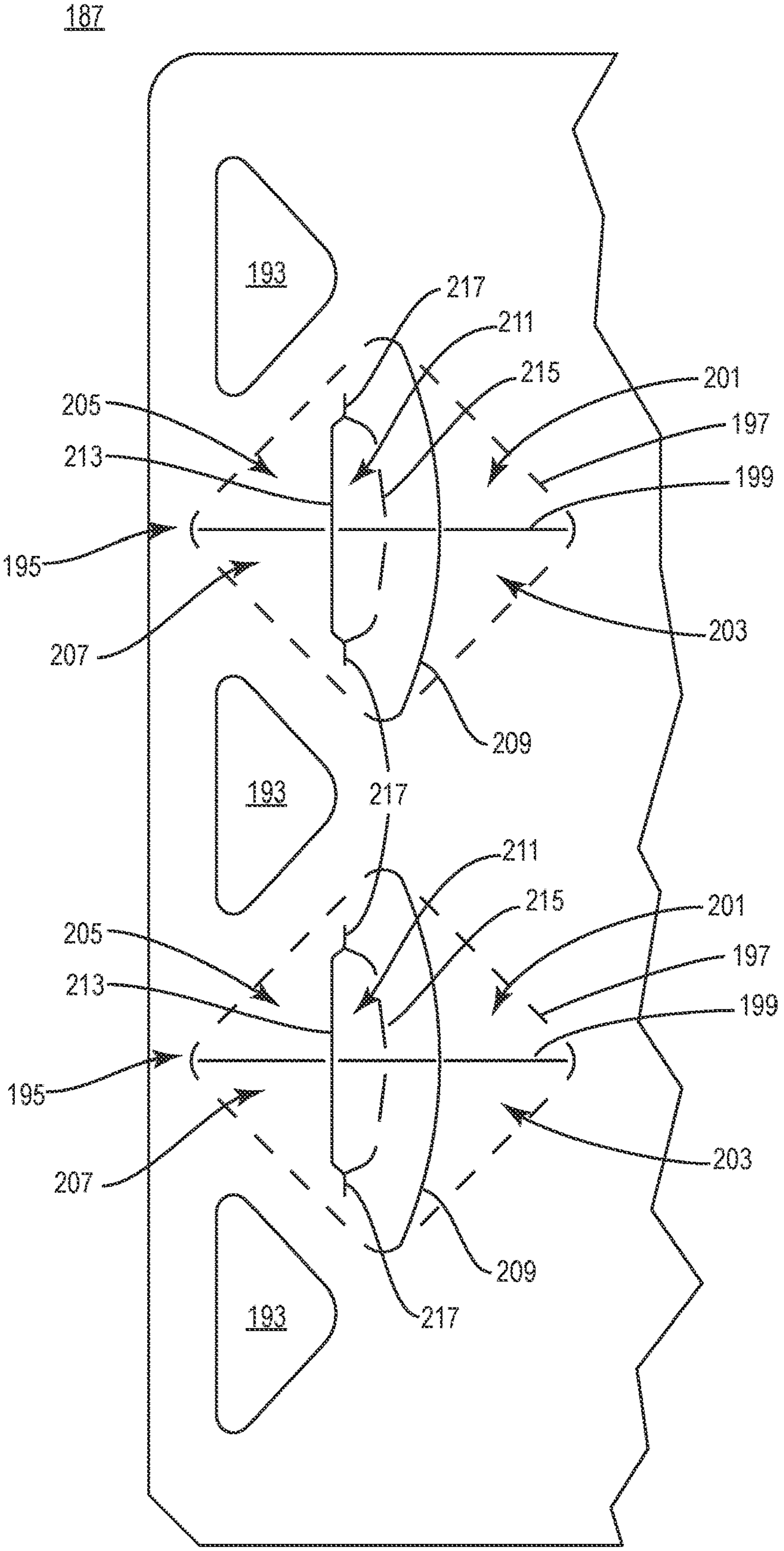
FIG. 1A is an enlarged view of a portion of the blank of FIG. 1.

With additional reference to FIG. 1A, the system engagement features 195 are shown in further detail. In the illustrated embodiment, the system engagement features 195 can include a plurality of lines of weakening (broadly, "respective first pluralities of lines of weakening") that can include a plurality of oblique fold lines arranged to form a generally diamond-shaped line of weakening 197 that is bisected by a longitudinal line of weakening 199 (broadly, "generally straight line of weakening") such that a plurality of sections 201, 203, 205, 207 are defined at least partially by and within the line of weakening 197. The line of weakening 199 can extend from a vertex of the line of weakening 197 to an opposite vertex of the line of weakening 197.

As described herein, "diamond-shaped" can refer to arrangements of lines of weakening generally approximating a regular or irregular diamond.

As also shown, a generally curved line of weakening 209 (broadly, "another line of weakening") can extend from a laterally upper portion of the line of weakening 197 to a laterally lower portion of the line of weakening 197 so as to intersect and bisect the line of weakening 197. Furthermore, a locking flap 211 can be foldably connected to one or more portions of the respective system engagement feature 195 at a generally curved fold line 215, and can be at least partially separable therefrom at a respective cut 213 extending from one endpoint of the fold line 215 to another endpoint of the fold line 215, and such that the locking flap 211 is bisected by a portion of the line of weakening 199. A pair of relief cuts 217 can extend laterally away from respective endpoints of the cut 213.

In the illustrated embodiment, the features of the back portion 109 of the blank 103 include, for example, a back panel 125*b* (broadly, "back side panel"), a first back side panel 127*b* (broadly, "first back end panel"), a second back side panel 143*b* (broadly, "second back end panel"), a first back central panel or first back keel 161*b*, a second back central panel or second back keel 165*b*, a back handle panel 169*b*, and a back handle reinforcement panel 183*b* having associated features such that the back portion 109 of the blank 103 is generally a mirror-image of the corresponding panels, flaps, and portions of the front portion 107 of the blank 103. Corresponding components (e.g., panels, flaps, fold lines, cuts, etc.) have been designated by corresponding reference numbers that differ by the "a" or "b" suffix, with the "a" components corresponding to the front portion 107 of the blank 103 and the "b" components corresponding to the back portion 109 of the blank 103.

As shown, the front handle panel 169*a* can be foldably connected to the back handle panel 169*b* at a lateral fold line 219 that intersects the fold lines 185*a*, 185*b*, and the front handle reinforcement panel 183*a* can be foldably connected to the back handle reinforcement panel 183*b* at a lateral fold line 221 that extends from the fold lines 185*a*, 185*b*. The lateral fold line 221 can also foldably connect the keels 165*a*, 165*b*.

As also shown, the back portion 109 of the blank 103 and the back portion 108 of the carrier 105 formed therefrom can include a back bottom end flap or back bottom panel 223 foldably connected to the attachment flap 187 foldably connected to the back panel 125*b* at the lateral fold line 189*b*.

Figure 1B:
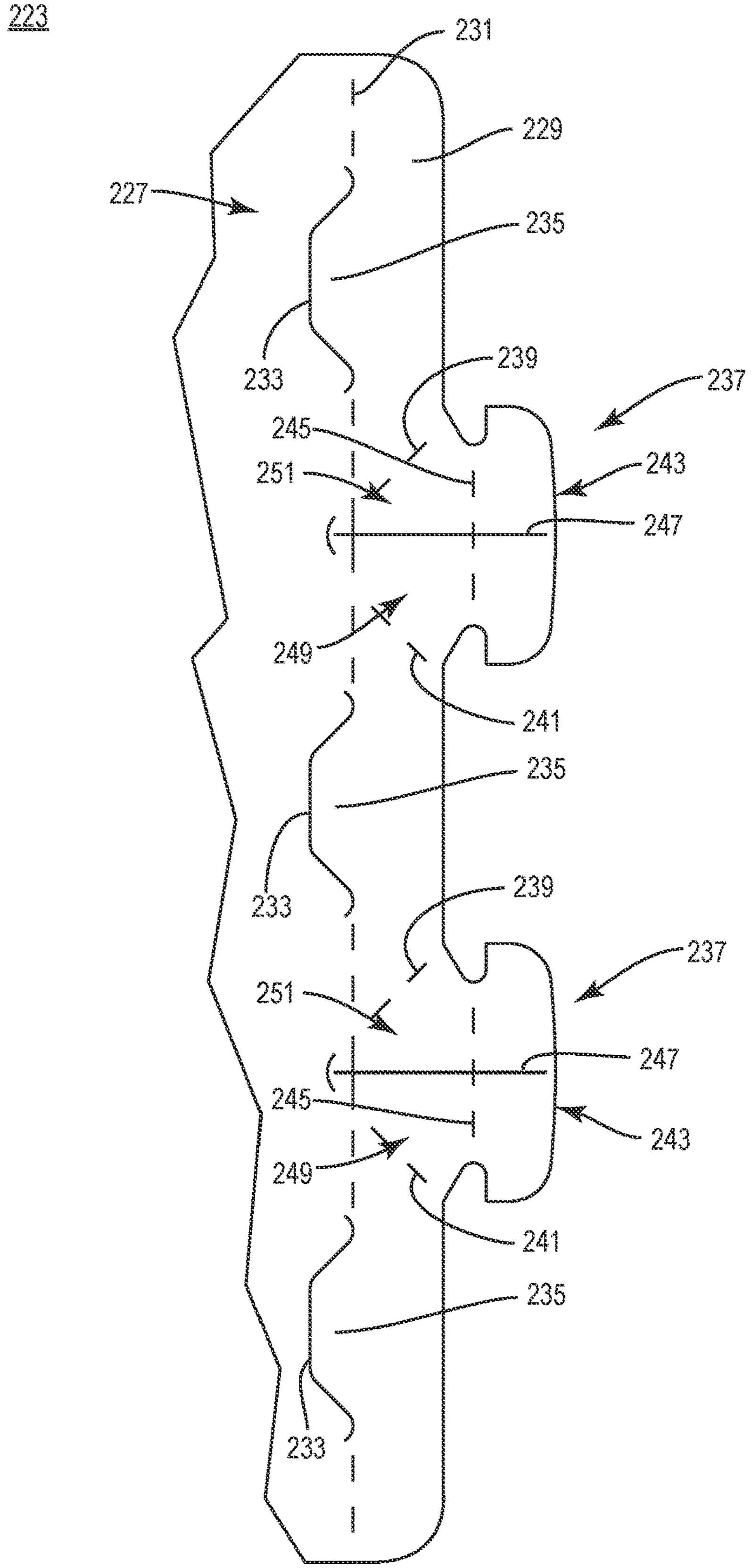
FIG. 1B is an enlarged view of another portion of the blank of FIG. 1.

With additional reference to FIG. 1B, the bottom panel 223, as shown, can include a base portion 227 foldably connected to the back panel 125*b* at the lateral fold line 189*b*, and a distal portion 229 foldably connected to the base portion 227 at a lateral fold line 231 interrupted by a plurality of laterally spaced cuts 233 each having one or more of straight, curved, and angled portions so as to define a respective plurality of locking tabs 235.

System engagement features 237 can also be associated with the back portion 109 of the blank 103/back portion 108 of the carrier 105. As shown in FIG. 1B, the system engagement features 237 can include a plurality of lines of weakening (broadly, "respective second pluralities of lines of weakening") that include respective pairs of oblique fold lines 239, 241 that intersect respective portions of the fold line 231. Locking tabs 243 can be foldably connected to and extend from the back bottom panel 223 at respective lateral fold lines 245, and the respective system engagement features 237 can be bisected by a respective longitudinal line of weakening 247 (broadly, "generally straight line of weakening") that extends from a respective intersection of the pairs of fold lines 239, 241 to a free edge of the respective locking tabs 243. In this regard, the system engagement features 237 can include at least respective sections 249, 251 at least partially defined by the respective lines of weakening 247, in addition to the bisected respective locking tabs 243.

As described herein, one or more of the locking tabs 243, locking flaps 211/associated openings exposed thereby, locking tabs 235, and locking openings 193 and associated features thereof can be locking features of the blank 103 and carrier 105 formed therefrom for at least partially maintaining a formed configuration of the carrier 105. It will be understood that some of the locking features of the blank 103 and carrier 105 formed therefrom can also be system engagement features of the blank 103 and carrier 105 formed therefrom, and vice versa.

Any of the panels, flaps, fold lines, cuts, or other features could be otherwise shaped, arranged, and/or omitted from the blank 103 without departing from the disclosure. The blank 103 could be sized and/or shaped to accommodate more or less than six containers without departing from this disclosure.

With additional reference to FIG. 2, according to one embodiment, the blank 103 can be inverted such that the exterior surface 101 thereof is positioned on a supporting surface and such that an interior surface thereof is positioned facing upwardly.

The handle reinforcement flaps 183*a*, 183*b*, can be separated from the keels 165*a*, 165*b* at the respective lines of weakening 184*a*, 184*b* and folded at the fold lines 185*a*, 185*b* into at least partial face-to-face contact with respective portions of the handle panels 169*a*, 169*b*.

The keels 161*a*, 161*b* can be folded at the respective fold lines 163*a*, 163*b* into at least partial face-to-face contact with respective portions of the side panels 127*a*, 127*b*, handle panels 169*a*, 169*b*, and handle reinforcement flaps 183*a*, 183*b*.

The side panels 143*a*, 143*b* can be folded at the respective fold lines 145*a*, 145*b* into at least partial face-to-face contact with respective portions of the front panel 125*a* and the back panel 125*b*, and such that the keels 165*a*, 165*b* are carried into at least partial face-to-face contact with respective portions of the front panel 125*a*, the back panel 125*b*, the handle panels 169*a*, 169*b*, and the handle reinforcement flaps 183*a*, 183*b*.

In such an arrangement, the front portion 107 of the blank 103 and the back portion 109 of the blank 103 can be folded at the overlapped and aligned fold lines 219, 221 such that the handle reinforcement flaps 183*a*, 183*b* are positioned in at least partial face-to-face contact between the overlapped handle panels 169*a*, 169*b* to form the handle 111.

In the aforementioned arrangement, respective upper portions of the keels 161*a*, 161*b* and keels 165*a*, 165*b* can be positioned in at least partial face-to-face contact between the handle panels 169*a*, 169*b* (and the handle reinforcement panels 183*a*, 183*b*) to provide a central supporting structure of the carrier 105.

Such state of the carrier 105 can be considered a folded, collapsed, unerected, etc. configuration of the carrier 105.

Such arrangement can be at least partially maintained via one or more applications of an adhesive such as glue.

In order to further erect the carrier 105, the front panel 125*a* and back panel 125 can be positioned in generally spaced and parallel relation, with the side panel 127*a* extending generally perpendicularly from the front panel 125*a* to the keel 161*a*, the side panel 127*b* extending from the back panel 125*b* to the keel 161*b*, the side panel 143*a* extending perpendicularly from the front panel 125*a* to the keel 165*a*, and the side panel 143*b* extending perpendicularly from the back panel 125*b* to the keel 165*b* to form an interior 113 of the carrier 105 that is generally bisected by the handle 111 and keels 161*a*, 161*b*, 165*a*, 165*b* to provide the front portion 106 of the carrier 105 and the back portion 108 of the carrier 105.

Thereafter, the bottom panel 187 and the bottom panel 223 can be folded at the respective fold lines 189*a*, 189*b* into at least partial face-to-face contact and into generally perpendicular relation with the panels 125*a*, 127*a*, 143*a*, 125*b*, 127*b*, 143*b*.

The locking tabs 235 can be at least partially separated from the base portion 227 of the bottom panel 223 at the respective cuts 233 and positioned to extend at least partially through the respective locking openings 193 of the bottom panel 187.

Furthermore, the locking tabs 243 can be at least partially folded at the respective fold lines 245 and pressed against the respective locking flaps 211 so as to at least partially separate the respective locking flaps 211 from the respective surrounding portions of the system engagement features 195 at the respective lines of weakening 213 such that the respective locking flaps 211 can at least partially expose a locking opening through which the respective locking tabs 243 can be at least partially received. In this regard, the respective locking tabs 243 can be at least partially received between a respective locking flap 211 and the bottom panel 187.

In some embodiments, such movement of the locking flaps 211 can include at least partial folding of the locking flaps 211 at the respective fold lines 215. In some embodiments, the locking flaps 211 can be at least partially separated from surrounding portions of the system engagement features 195 prior to engagement by the respective locking tabs 243.

The aforementioned arrangement of the bottom panels 187, 223 is such that the sections 249, 251 of the respective system engagement features 237 of the bottom panel 223 can be generally aligned and in at least partial face-to-face contact with the respective sections 207, 205 of the respective system engagement features 195 of the bottom panel 187.

In such an arrangement, three containers C can be inserted into the interior 113 of the carrier 105 in the front portion 106 of the carrier 105 and three containers C can be inserted into the interior 113 of the carrier 105 in the back portion 108 of the carrier 105, though a different number and/or arrangement of containers C can be provided in the interior 113 of the carrier 105 without departing from the disclosure. The carrier 105 can be provided with one or more of the containers C as a package 115.

Figure 3:
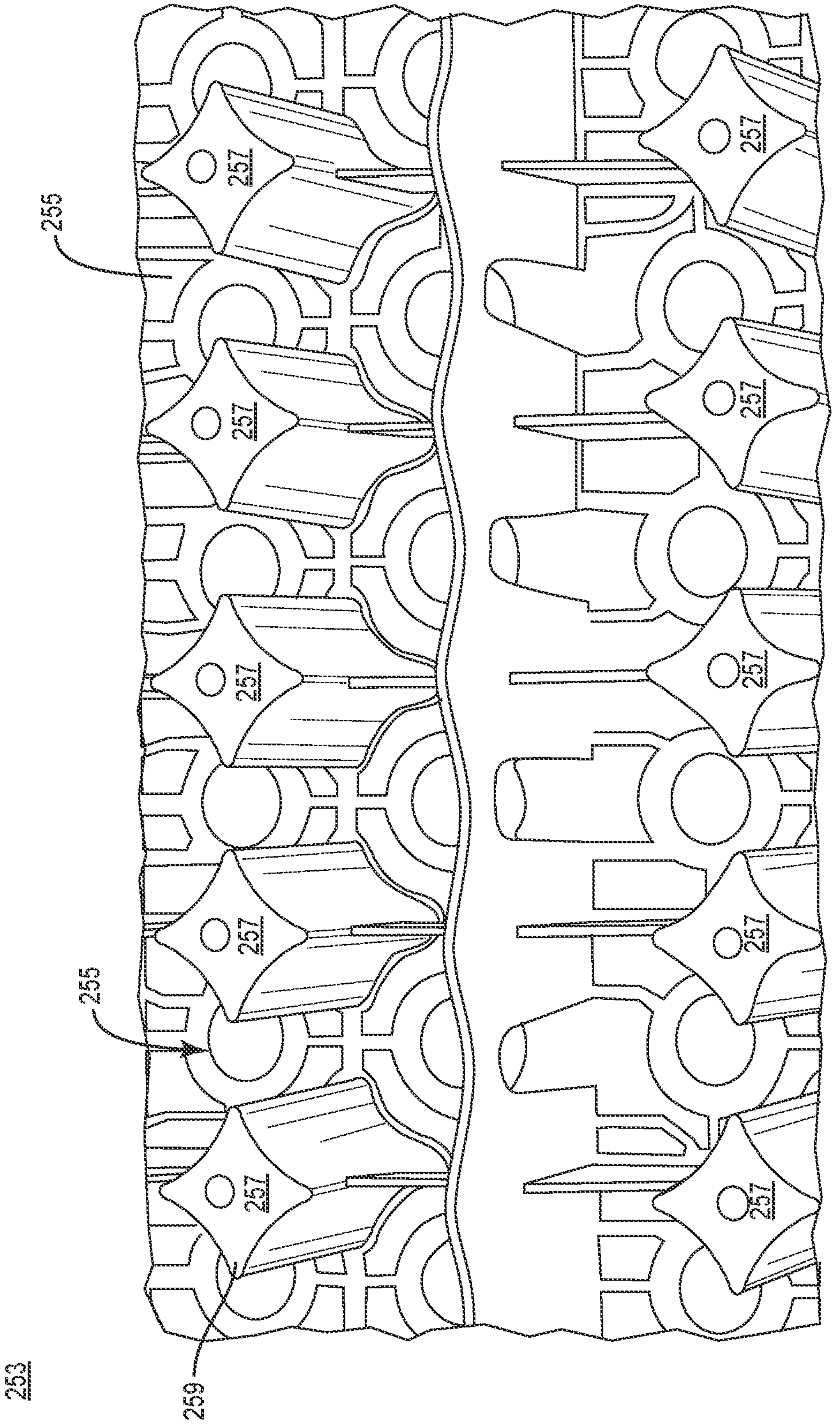
FIG. 3 is a perspective view of a portion of an outer container for receiving at least one carrier as described according to exemplary embodiments described herein.

Referring additionally to FIG. 3, a portion of a crate or outer container 253 for receiving at least one carrier 105 for storage and/or transport is illustrated. The outer container 253 can include a bottom wall 255 and sidewalls 256 (FIG. 4) that extend upwardly from the bottom wall 255 and that intersect at respective corners. The bottom wall 255 and the sidewalls 256 can extend at least partially around an interior 258 of the outer container 253.

A series of pinols or posts 257 can extending upwardly from the bottom wall 255 of the outer container 233. The posts 257 can include one or more vertically recessed portions extending therealong so as to at least partially define flanges 259 extending outwardly to respective adjacent sidewalls. It will be understood that the outer container 253 can have a different configuration without departing from the disclosure.

Figure 4:
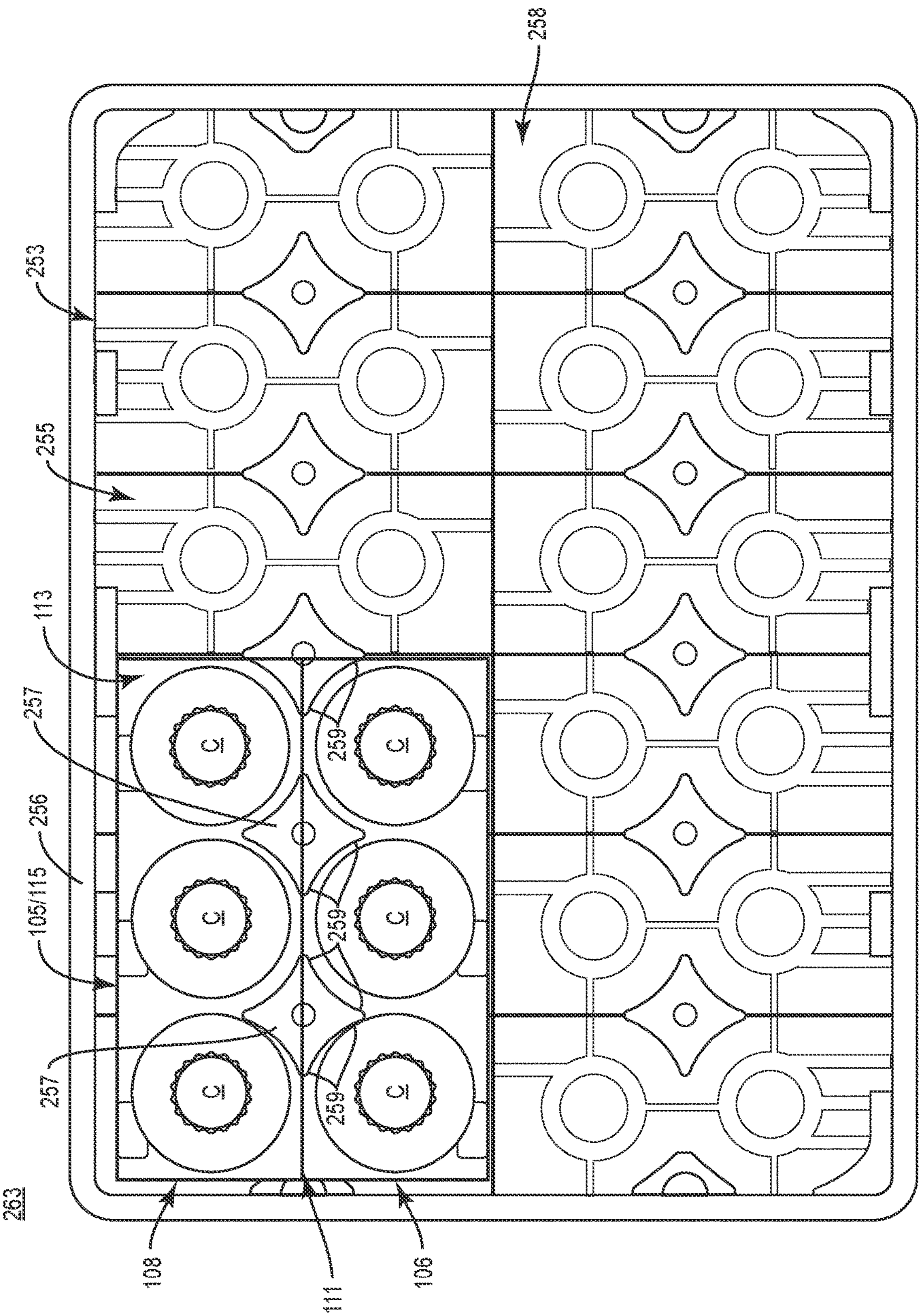
FIG. 4 is a plan view of a portion of a system including the carrier and package of FIG. 2 received in the outer container of FIG. 3.

With additional reference to FIG. 4, one or more carriers 105 can be inserted into the interior of an outer container 253 and positioned such that the system engagement features 195, 237 are aligned with respective posts 257.

Figure 5:
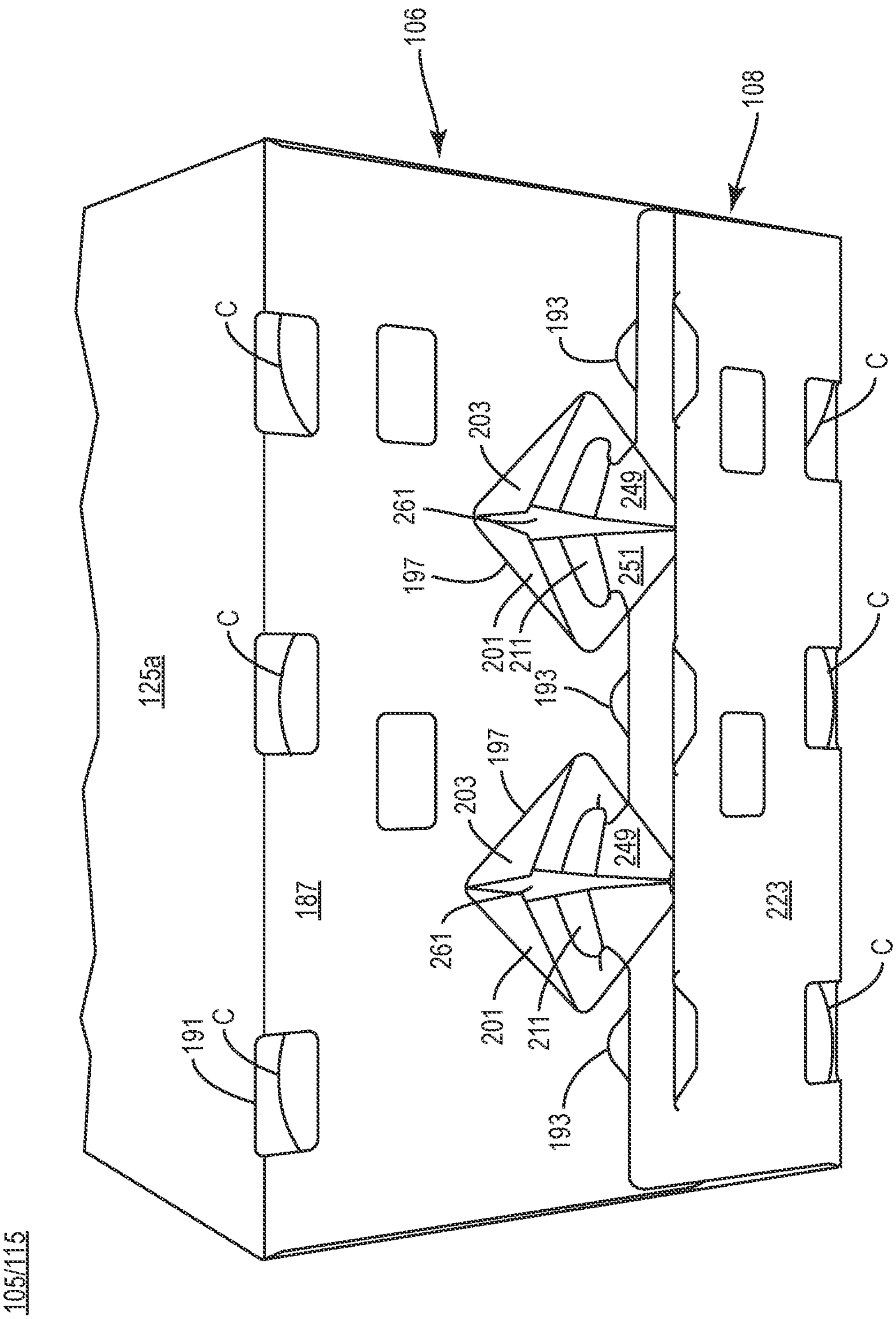
FIG. 5 is a bottom perspective view of the carrier and package of FIG. 2 as configured to for seating in the outer container of FIG. 3.

As shown in FIG. 5, in such an arrangement, the sections 249, 251 of the respective system engagement features 237 can at least partially separate at the respective line of weakening 247. In some embodiments, the respective locking tabs 243 can at least partially separate long the line of weakening 257.

Furthermore, upon engagement with a respective post 257, the respective system engagement features 195 can move such that each respective section 201, 203, 205, 207 and locking flap 211 thereof can at least partially separate from a remaining section thereof at one or more portions of one or more of the respective line of weakening 199 and the respective line of weakening 209.

As the aforementioned movement of the respective system engagement features 195, 237 occurs with respective system engagement features 195, 237 in at least partial overlapping relation, e.g., such that the sections 249, 251 and locking tabs 243 of the respective system engagement features 237 are generally aligned with the sections 203, 201, 207, 205 of the respective system engagement features 195, respective system engagement openings 261 can be formed thereby, and through which the respective posts 257 can be at least partially received in the interior 113 of a respective carrier 105.

In this regard, the respective posts 257 can be received in the interior 113 of the respective carrier 105 such that a respective post 257 can be disposed between four adjacent containers C, for example, to maintain positional stability and/or to cushion the containers C from impacts or vibrations. In some embodiments, the flanges 259 associated with the respective posts 257 can be configured, for example, to accommodate the curvature of an abutting container C.

In addition, the at least partial receipt of the posts 257 in the interior 113 of a carrier 105 provides a secure engagement of the carrier(s) 105 with the outer container 253, e.g., to minimize shifting, sliding, inadvertent movement, etc. of the respective carrier(s) 105 in the interior of the outer container 253, for example, during movement incidental to transport and/or storage. It will be understood that the outer container 253 can be provided with one or more carriers 105 as a system 263.

When it is desired to remove one or more carrier 105 from the outer container 253, a user can grasp such carrier(s) 105 at a respective handle 111. In some embodiments, the user can at least partially separate the handle flaps 177*a*, 177*b* from the respective handle panels 169*a*, 169*b* at a respective cut 181*a*, 181*b* and fold the respective handle flaps 177*a*, 177*b* at the respective fold lines 179*a*, 179*b* to expose a handle opening through which one or more of the user's fingers can be curled around a portion of the handle panels 169*a*, 169*b*, with one or both of the handle flaps 177*a*, 177*b* positioned therebetween, for example, for comfort, to avoid pinching, to strengthen the user's grip, to avoid tearing of the handle 111 and/or other portions of the carrier 105, etc.

As the carrier 105 is withdrawn from the outer container 253, the respective posts 257 can be withdrawn from the interior 113 of the respective carrier 105 through the respective system engagement openings 261. Upon such relative movement, the respective sections 249, 251 and locking tabs 243 of each respective system engagement feature 237 and the respective sections 201, 203, 205, 207 and locking flap 211 of each respective system engagement feature 195 can return to a generally planar arrangement such that the engagement of respective locking tabs 243 and openings formed by respective locking flaps 211 can be at least partially returned to maintain the integrity of the carrier 105 and package 115 for subsequent use by a user.

In addition or in the alternative, the at least partial receipt of the locking tabs 235 in the respective locking openings 193 can remain uninterrupted by the at least partial receipt and/or removal of the respective posts 257 of the outer container 253 from the interior 113 of the respective carrier 105.

Figure 6:
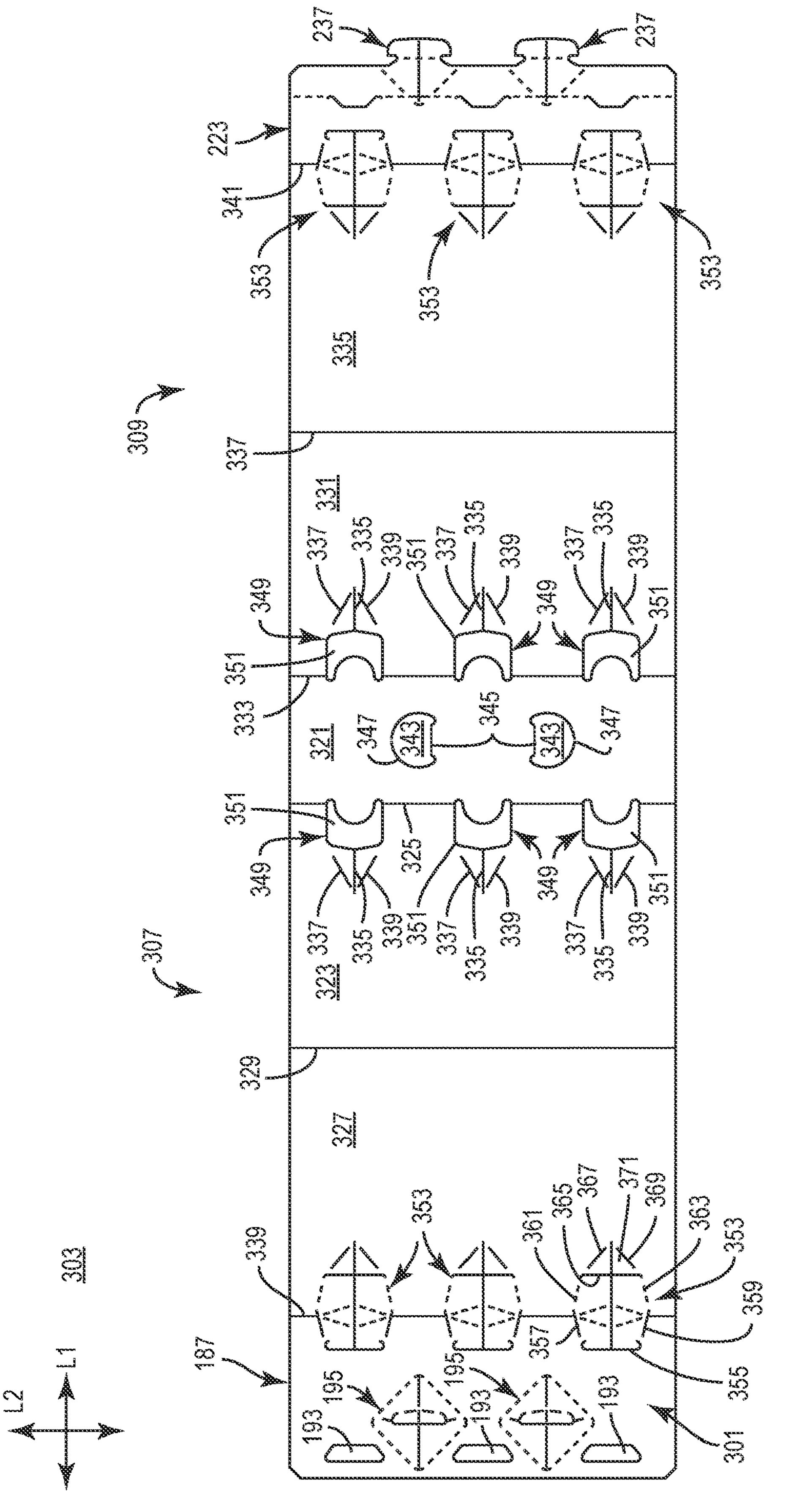
FIG. 6 is a plan view of an exterior surface of a blank for forming a carrier according to a second exemplary embodiment of the disclosure.

Turning to FIG. 6, a plan view of an exterior surface 301 of a blank 303 for forming a carrier 305 (FIG. 7) for one or more containers C is illustrated. The blank 303 and carrier 305 formed therefrom can have one or more features that are the same or similar to those described above with respect to the blank 103 and carrier 105 formed therefrom, and like or similar features are designated with like or similar reference numerals.

As shown, the blank 303 can have the longitudinal axis L1 and the lateral axis L2, a front portion 307 for forming a front portion 306 of the carrier 305 and a back portion 309 for forming a back portion 308 of the carrier 305.

The blank 303 and carrier 305 formed therefrom can also include a plurality of panels that includes a top panel 321, a front upper side panel 323 foldably connected to the top panel 321 at a lateral fold line 325, a front lower side panel 327 foldably connected to the front upper side panel 323 at a lateral fold line 329, a back upper side panel 331 foldably connected to the top panel 321 at a lateral fold line 333, and a back lower side panel 335 foldably connected to the back upper side panel 331 at a lateral fold line 337.

The blank 303 and carrier 305 formed therefrom can also include the bottom panel 187 foldably connected to the front lower side panel 327 at a lateral fold line 339, and the bottom panel 223 foldably connected to the back lower side panel 335 at a lateral fold line 341. The bottom panels 187, 223 can have the same general arrangement as those described above with respect to the blank 103 and carrier 105, e.g., so as to include the respective system engagement features 195, 237.

The blank 303 and carrier 305 formed therefrom can include handle features that can include a pair of laterally opposed finger flaps or handle flaps 343 foldably connected to the top panel 321 at respective longitudinal fold lines 345 and separable therefrom at generally curved cuts 347 that extend from one respective endpoint of a respective fold line 345 to the other respective endpoint of a respective fold line 345.

The blank 303 and carrier 305 formed therefrom can additionally include container retention features that can include a plurality of upper container retention features 349 each having a generally dual pronged shaped cut/opening 351 extending from the respective upper side panels 323, 331 to the top panel 321 so as to interrupt the respective fold lines 325, 333. A respective longitudinal line of weakening 335 and respective pair of oblique lines of weakening 337, 339 can also extend from the respective cuts 351.

The container retention features can also include a plurality of lower container retention features 353 each including a generally lateral cut 355 in the respective bottom panels 187, 223, a respective pair of oblique cuts 357, 359 extending from the respective cuts 355 so as to interrupt the respective fold lines 339, 341. Respective oblique cuts 361, 363 can also extend from the respective cuts 357, 359 toward a generally lateral cut 365, from which a pair of oblique cuts 367, 369 further extend. The aforementioned arrangement of the respective lower contention retention features 353 can be at least partially bisected by a respective longitudinal fold line 371.

Figure 7:
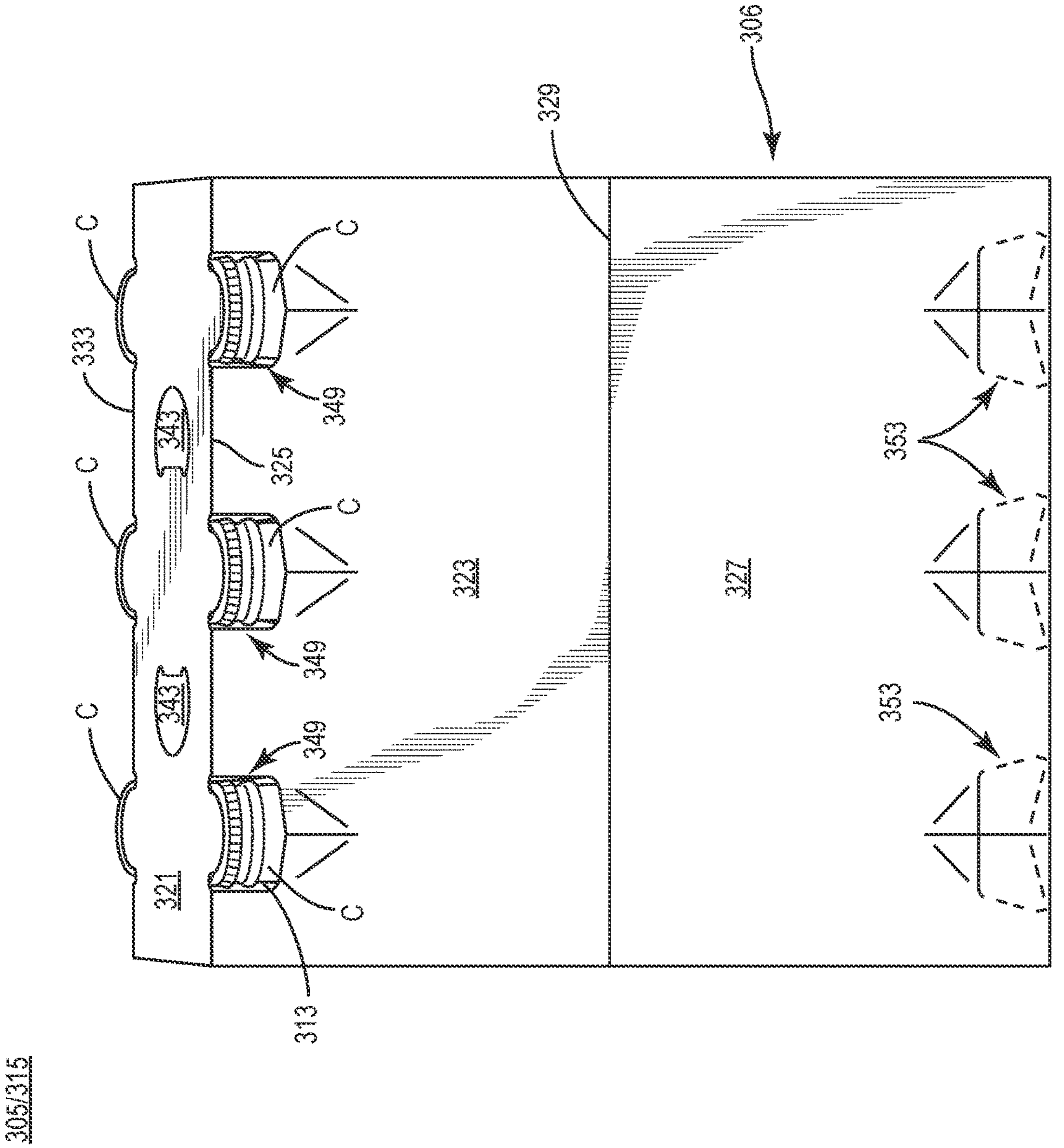
FIG. 7 is a perspective view of a carrier and package formed from the blank of FIG. 6 according to the second exemplary embodiment of the disclosure.
Figure 8:
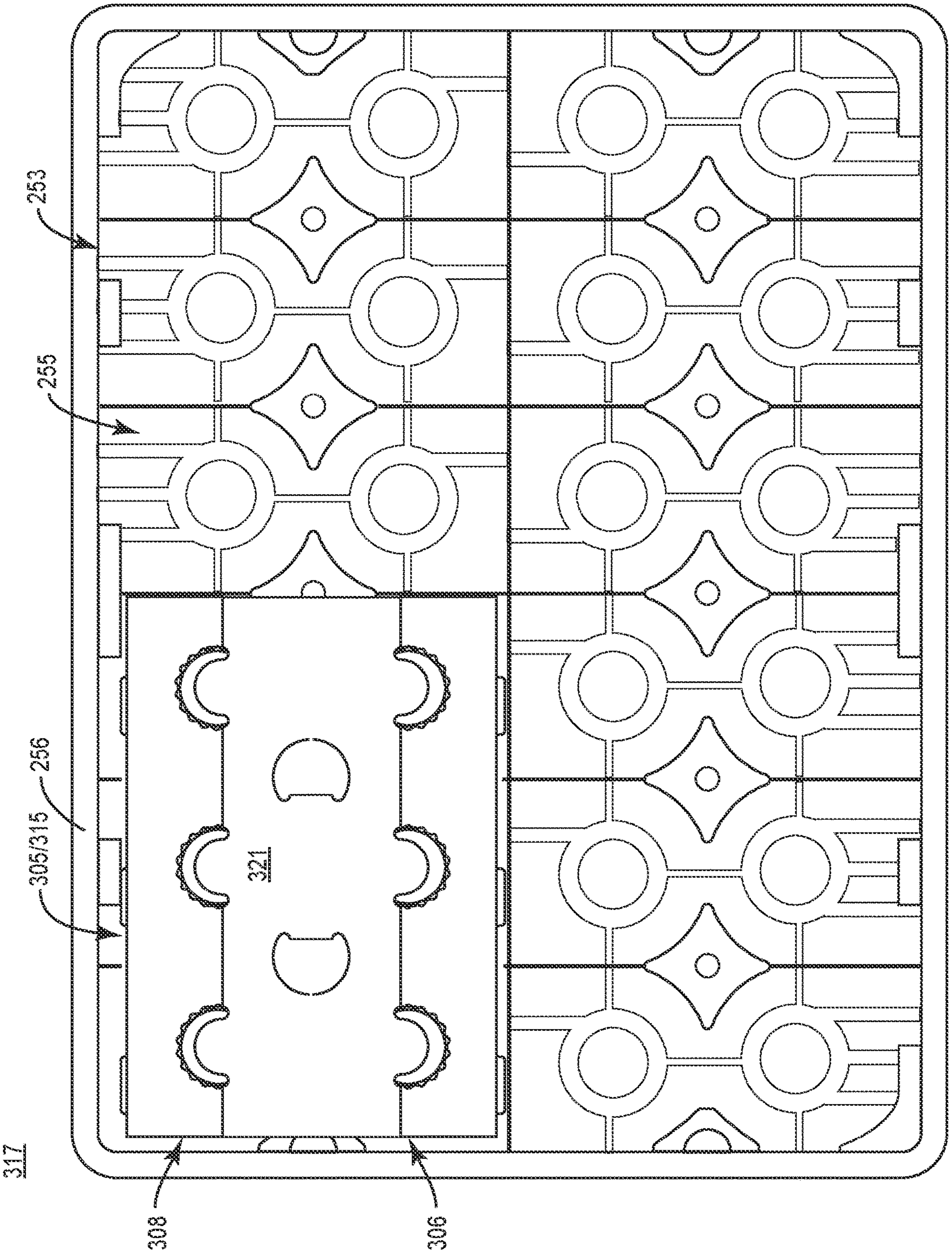
FIG. 8 is a plan view of a portion of a system including the carrier and package of FIG. 7 received in the outer container of FIG. 3.

With additional reference to FIG. 7, in order to form a carrier 305 from the blank 303, the panels 321, 323, 327, 331, and 335 can be positioned extending at least partially around an interior 313 of the carrier 305 within which the plurality of containers C can be held.

For example, in one embodiment, the upper side panels 323, 331 can be folded at least partially downwardly relative to the top panel 231 at the respective fold lines 325, 333. The lower side panels 327, 335 can be positioned extending downwardly form the respective upper side panel 323, 331, and in some embodiments, can be at least partially folded at the respective fold lines 329, 337 so as to have an oblique arrangement with respective to the respective upper side panels 323, 331.

In some embodiments, the panels 321, 323, 331, 325, 333 can be arranged about the containers C such that respective upper portions of the respective containers C, e.g., proximate a neck and/or cap thereof, can be at least partially received in the respective cuts 351, with one or more portions of the container retentions features 349 configured to move relative to one another at the respective lines of weakening 335, 337, 339 so as to at least partially contour to a shape of an upper portion of the respective container C.

The bottom panels 187, 223 can then be folded at the respective fold lines 339, 341 into at least partial overlapping relation and such that the respective locking features thereof engage one another as described above with respect to the formation of the carrier 103 from the blank 105.

The lower container retention features 353 can at least partially engage lower portions of the respective containers C. For example, in some embodiments, one or more portions of the respective lower container retention features 353 can be configured to move relative to one another at the respective cuts 355, 357, 359, 361, 363, 367, 369 to at least partially contour to a shape of a lower portion of the respective container C.

Such arrangement of the carrier 305 can be at least partially maintained with one or more applications of an adhesive such as glue.

Figure 9:
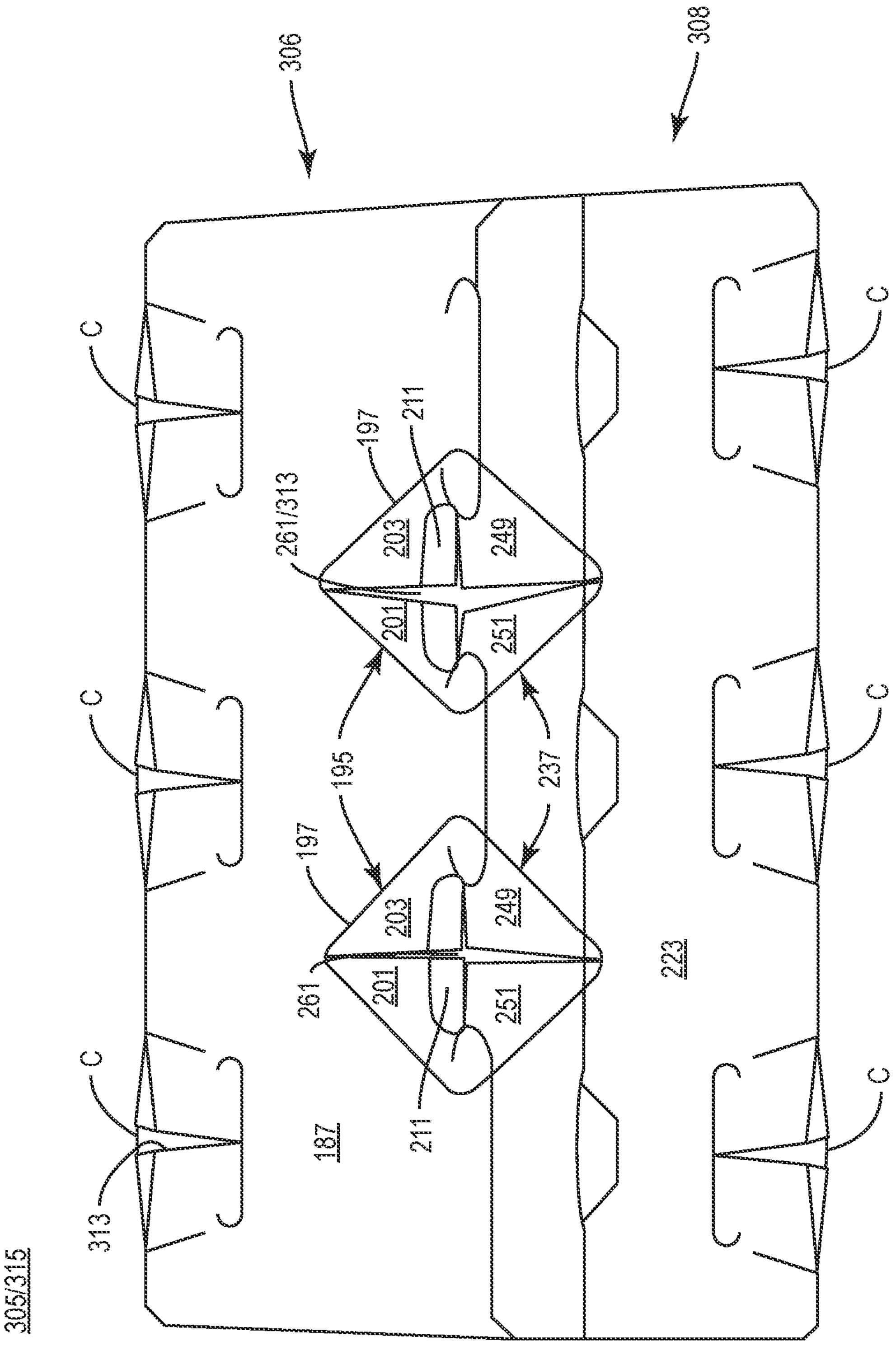
FIG. 9 is a bottom perspective view of the carrier and package of FIG. 7 as configured to for seating in the outer container of FIG. 3.

In this regard, a carrier 305 can be formed from the blank 303 having the bottom panels 187, 223 arranged to provide the system engagement features 195, 237 for at least partially engaging/receiving respective posts 257 of a respective outer container 253 to provide a system 317, with advantages similar to those described above with respect to the carrier 105. FIG. 9 illustrates the reconfiguration of the system engagement features 195, 237 for receiving a respective post 257 as described above with respect to the carrier 105/system 263.

It will be understood that the carrier 305 can be provided with one or more containers C to provide a package 315, and that one or more carrier 305/package 315 can be engaged with an outer container 253 as described above to form the system 317.

Figure 10:
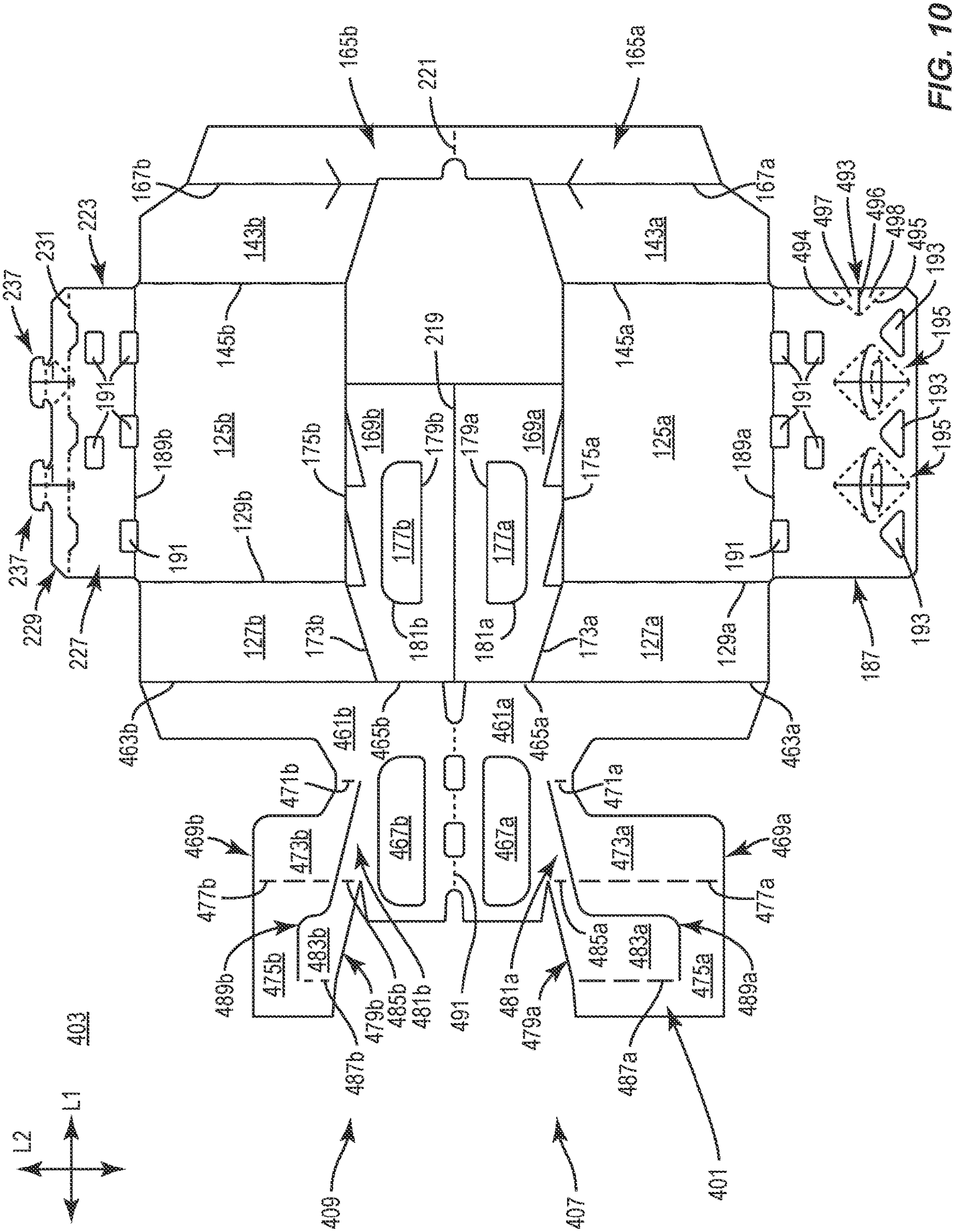
FIG. 10 is a plan view of an exterior surface of a blank for forming a carrier according to a third exemplary embodiment of the disclosure.

Turning to FIG. 10, a plan view of an exterior surface 401 of a blank 403 for forming a carrier 405 for one or more containers C is illustrated. The blank 403 and carrier 405 formed therefrom can have one or more features that are the same or similar to those described above with respect to the blanks 103, 303 and respective carriers 105, 305 formed therefrom, and like or similar features are designated with like or similar reference numerals.

The blank 403, as shown, can have the longitudinal axis L1 and the lateral axis L2, though the blank 403 can generally be reoriented such that the fold line 219 is generally parallel to the longitudinal axis L1, e.g., such that the blank 403 is rotated counterclockwise 90° relative to the orientation of the blank 103 described above. It will be understood that the blank 403 can have a different orientation without departing from the disclosure.

The blank 403 can include a front portion 407 for forming a front portion 406 of the carrier 405 and a back portion 409 for forming a front portion 408 of the carrier 405.

The blank 403 and carrier 405 formed therefrom can also include a plurality of panels including the front panel 125*a*, the back panel 125*a*, the side panels 127*a*, 127*b*, 143*a*, 143*b*, the handle panels 169*a*, 169*b*, the keels 165*a*, 165*b*, the bottom panels 187, 223, and associated features. The blank 403 and carrier 405 formed therefrom can also include the handle flaps 177*a*, 177*b* and associated features.

In the illustrated embodiment, the blank 403 and carrier 405 formed therefrom can include a front central panel 461*a* foldably connected to the front side panel 127*a* at a lateral fold line 463*a*, and can be foldably connected to the front handle panel 169*a* at a lateral fold line 465*a* that can be collinear with the fold line 463*a*. Similarly, the blank 403 and carrier 405 formed therefrom can include a back central panel 461*b* foldably connected to the back side panel 127*b* at a lateral fold line 463*b*, and can be foldably connected to the back handle panel 169*b* at a lateral fold line 465*b* that can be collinear with the fold lines 463*a*, 465*a*, 463*b*.

The front central panel 461*a*, as shown, can include a handle opening 467*a*. A first front divider flap 469*a* can be foldably connected to the front central panel 461*a* at a lateral fold line 471*a*, and can include a divider portion 473*a* foldably connected to the front central panel 461*a* at the lateral fold line 471*a*, and an attachment portion 475*a* foldably connected to the divider portion 473*a* at a lateral fold line 477*a*.

A second front divider flap 479*a* can extend from the central panel 461*a*, and can include a divider portion 481*a* extending from the central panel 461*a* and an attachment portion 483*a* foldably connected to the divider portion 481*a* at a lateral fold line 485*a*. The attachment portion 483*a* of the divider flap 479*a* can also be foldably connected to the attachment portion 475*a* of the divider flap 469*a* at a lateral fold line 487*a*.

The divider flap 479*a* can be separably connected to the central panel 461*a* at a cut 489*a* having one or more of oblique, straight, and curved portions such that the cut 489*a* intersects the fold line 471*a*, the fold line 477*a*, and the fold line 487*a*. In this regard, the divider flap 469*a* can be separably connected to the divider flap 479*a* at respective portions of the cut 489*a*.

Still referring to FIG. 10, corresponding components of the back central panel 461*b* and back divider flaps 469*b*, 479*b* been designated by corresponding reference numbers that differ by the "a" or "b" suffix, with the "a" components corresponding to the front central panel 461*a* and front divider flaps 469*a*, 479*a* described above. It will be understood that one or both of the central panels 461*a*, 461*b* and divider flaps 469*a*, 479*a*, 469*b*, 479*b* can have a different configuration without departing from the disclosure.

As shown, the front central panel 461*a* and the back central panel 461*b* can be foldably connected to one another at a longitudinal fold line 491 that is coaxial with the fold line 219.

As also shown, the bottom panel 187 can additionally include a system engagement feature 497 having one or more portions similar to the system engagement features 195. The system engagement feature 493 can include a pair of intersecting oblique lines of weakening 494, 495 that extend to a free edge of the bottom panel 187. A longitudinal line of weakening 496 can extend from the intersection of the lines of weakening 494, 495 to a free edge of the bottom panel 187 to define sections 497, 498 of the system engagement feature 493.

Figure 11:
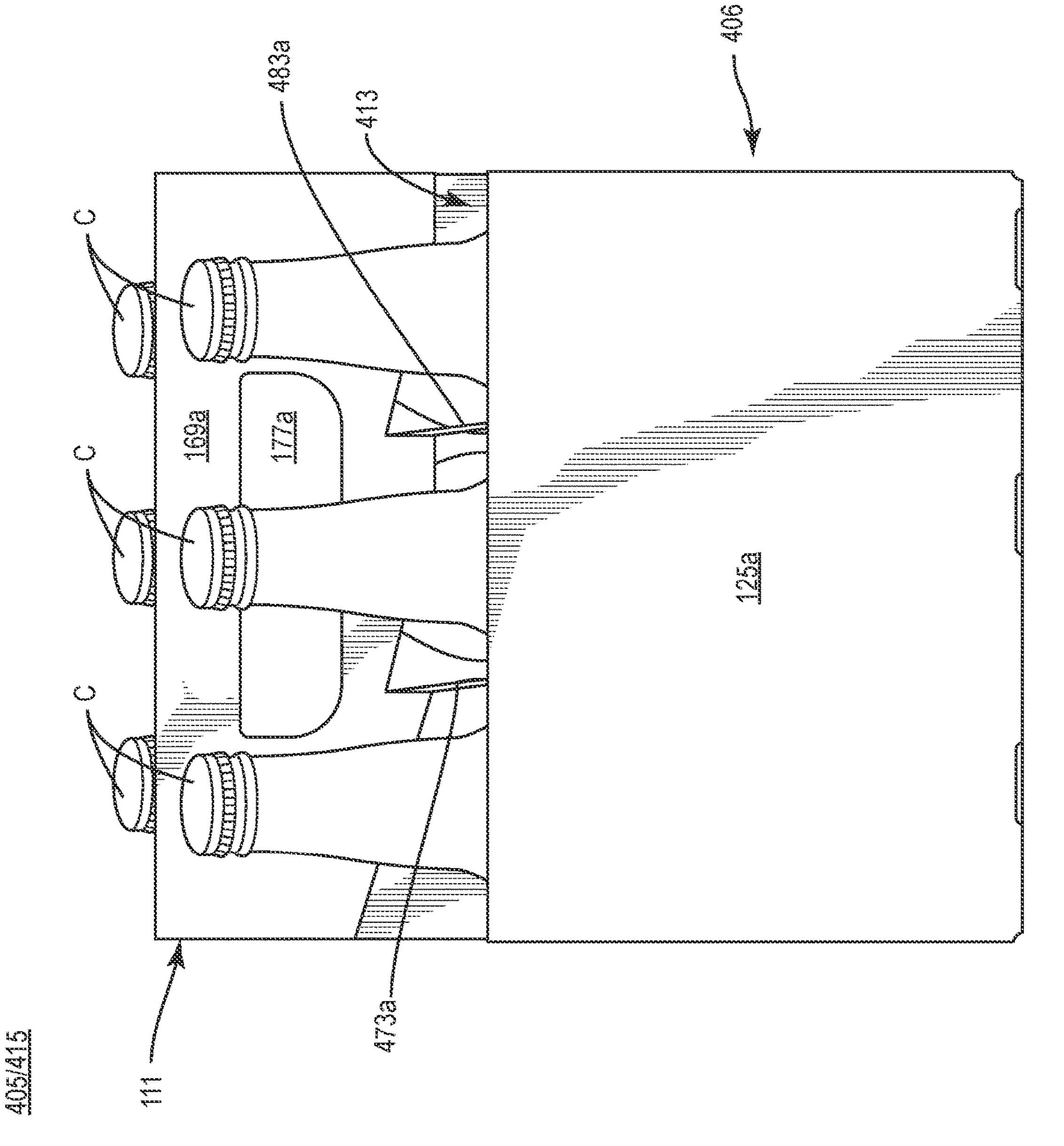
FIG. 11 is a perspective view of a carrier and package formed from the blank of FIG. 10 according to the third exemplary embodiment of the disclosure.
Figure 12:
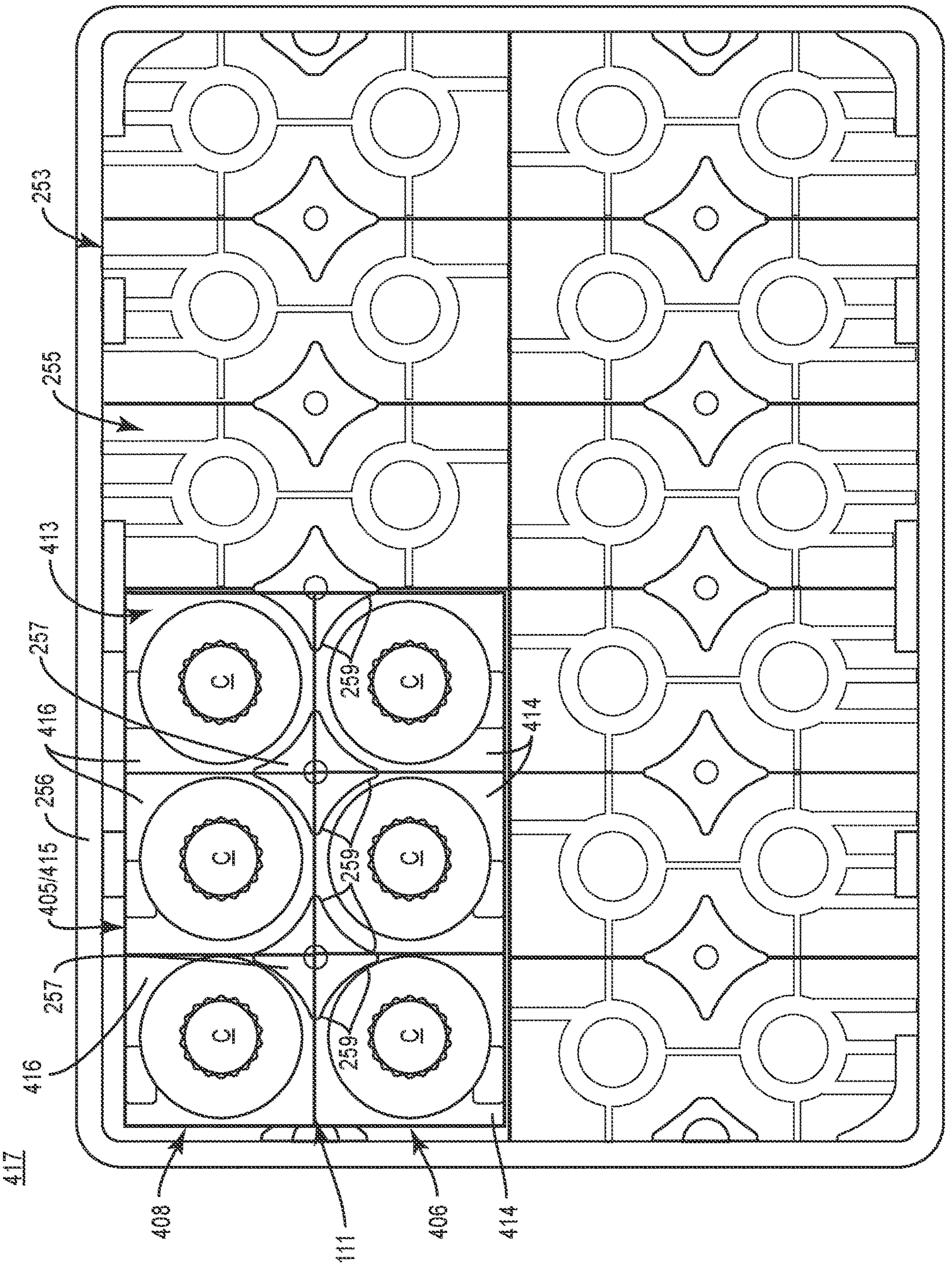
FIG. 12 is a plan view of a portion of a system including the carrier and package of FIG. 11 received in the outer container of FIG. 3.
Figure 13:
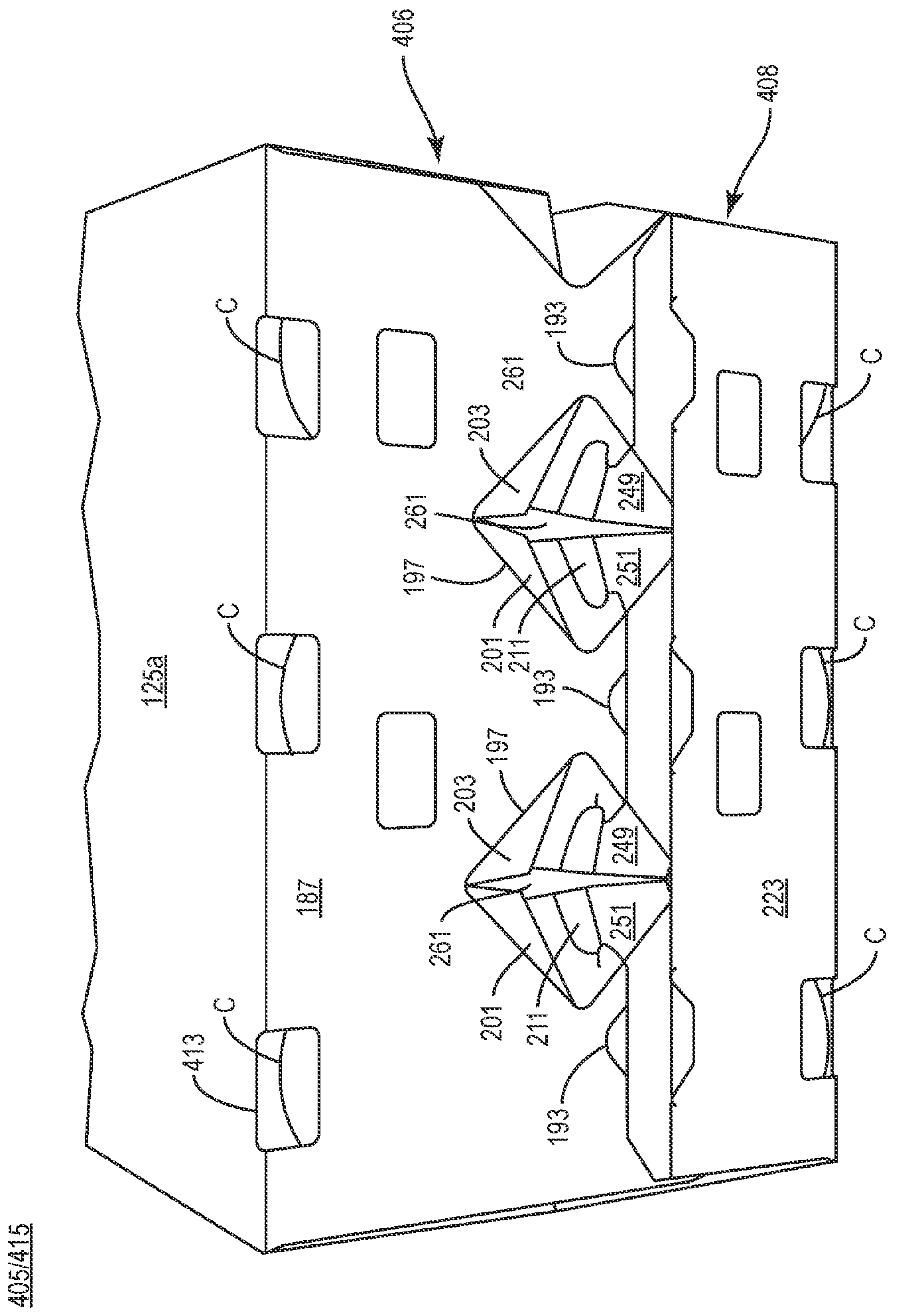
FIG. 13 is a bottom perspective view of the carrier and package of FIG. 11 as configured to for seating in the outer container of FIG. 3.

Turning now to FIG. 11, according to one embodiment, the blank 403 can be inverted such that the exterior surface 401 thereof is positioned on a supporting surface and such that an interior surface thereof is positioned facing upwardly.

The central panels 461*a*, 461*b* can be folded at the respective fold lines 463*a*, 465*a*, 463*b*, 465*b* into at least partial face-to-face contact with respective portions of the side panels 127*a*, 127*b*, the handle panels 169*a*, 169*b*, the front panel 125*a*, and the back panel 125*b*, and such that the divider flaps 469*a*, 479*a*, 469*b*, 479*b* are carried into at least partial face-to-face contact with the respective front panel 125*a* and back panel 125*b*.

The side panels 143*a*, 143*b* can be folded at the respective fold lines 145*a*, 145*b* into at least partial face-to-face contact with respective portions of the front panel 125*a* and divider flaps 469*a*, 479*a* and the back panel 125*b* and divider flaps 469*b*, 479*b*, and such that the keels 165*a*, 165*b* are carried into at least partial face-to-face contact with respective portions of the front panel 125*a*, the back panel 125*b*, and the divider flaps 469*a*, 479*a*, 469*b*, 479*b*.

In such an arrangement, the front portion 107 of the blank 103 and the back portion 109 of the blank 103 can be folded at the overlapped and aligned fold lines 219, 221, 491 such that respective portions of the central panels 461*a*, 461*b* are positioned in at least partial face-to-face contact between the overlapped handle panels 169*a*, 169*b* to form a handle 411.

In the aforementioned arrangement, respective upper portions of the central panels 461*a*, 461*b* and keels 165*a*, 165*b* can be positioned in at least partial face-to-face contact between the handle panels 169*a*, 169*b* to provide a central supporting structure of the carrier 405.

Such state of the carrier 405 can be considered a folded, collapsed, unerected, etc. configuration of the carrier 405. Such arrangement of the carrier 405 can be at least partially maintained via one or more applications of an adhesive such as glue.

In order to further erect the carrier 405, the front panel 125*a* and back panel 125 can be positioned in generally spaced and parallel relation, with the side panel 127*a* extending generally perpendicularly from the front panel 125*a* to the central panel 461*a*, the side panel 127*b* extending generally perpendicularly from the back panel 125*b* to the central panel 461*b*, the side panel 143*a* extending generally perpendicularly from the front panel 125*a* to the keel 165*a*, and the side panel 143*b* extending generally perpendicularly from the back panel 125*b* to the keel 165*b* to form an interior 413 of the carrier 405 that is generally bisected by the handle 411, central panels 461*a*, 461*b*, and keels 165*a*, 165*b* to provide the front portion 406 of the carrier 405 and the back portion 408 of the carrier 405.

During such positioning of the panels 125a, 125b, 127a, 127b, 143a, 143b, 165a, 165b, 461a, and 461b, the divider flaps 469a, 479a can at least partially separate from the central panel 461a at respective portions of the cut 489a such that the divider portions 473a, 481a of the respective divider flaps 469a, 479a extend from the central panel 461a to the front panel 125a, with the respective attachment portions 475a, 483a of the respective divider flaps 469a, 479a folded at the respective fold lines 477a, 485a/487a into at least partial face-to-face contact with the front panel 125a.

Similarly, the divider flaps 469b, 479b can at least partially separate from the central panel 461b at respective portions of the cut 489b such that the divider portions 473b, 481b of the respective divider flaps 469b, 479b extend from the central panel 461b to the back panel 125b, with the respective attachment portions 475b, 483b of the respective divider flaps 469b, 479b folded at the respective fold lines 477b, 485b/487b into at least partial face-to-face contact with the back panel 125b.

In such an arrangement, the divider flaps 469a, 479a can at least partially define a plurality of container retention spaces 414 in the interior 413 of the carrier 405 in the front portion 406 thereof, and the divider flaps 469b, 479b can at least partially define a plurality of container retention spaces 416 in the interior 413 of the carrier 405 in the back portion 408 thereof, each respective container retention space 414, 416 for at least partially receiving a respective container C of the plurality of containers C. The carrier 405 can be provided with one or more containers C as a package 415.

Thereafter, the bottom panel 187 and the bottom panel 223 can be folded at the respective fold lines 189a, 189b into at least partial face-to-face contact and in generally perpendicular relation with the panels 125a, 127a, 143a, 461a, 125b, 127b, 143b, 461b, and the respective locking features thereof engage one another as described above with respect to the formation of the carriers 103, 303 from the respective blanks 105, 305.

In this regard, and with additional reference to FIG. 11, a carrier 405 can be formed from the blank 403 having the bottom panels 187, 223 arranged to provide the system engagement features 195, 237 for at least partially engaging/receiving respective posts 257 of a respective outer container 253 to form a system 417, with advantages similar to those described above with respect to the carriers 105, 305.

It will be understood that the carrier 405 can be provided with one or more containers C to provide a package 415, and that one or more carrier 405/package 415 can be engaged with an outer container 253 as described above to form the system 417.

In this regard, the system engagement feature 493 can at least partially reconfigure, e.g., via relative movement of the sections 497, 498 thereof via at least partial folding at the respective lines of weakening 494, 495, 496, to at least partially receive a portion of a post 257, e.g., a flange 259 thereof, abutting an end of the carrier 405 proximate the side panels 143a, 145a, with advantages similar to those described above as being provided by the system engagement features 195, 237.

As an example, a tear line can include: a slit that extends partially into the material along the desired line of weakness, and/or a series of spaced apart slits that extend partially into and/or completely through the material along the desired line of weakness, or various combinations of these features. As a more specific example, one type of tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carrier embodiments. The term "glue" is intended to encompass all manner of adhesives commonly used to secure carrier panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carrier for holding a plurality of containers, the carrier comprising:

a plurality of panels extending at least partially around an interior of the carrier, the plurality of panels comprising a plurality of side panels and at least one bottom panel foldably connected to a respective panel of the plurality of panels;

locking features in the at least one bottom panel for at least partially maintaining a formed configuration of the carrier; and a plurality of system engagement features for at least partially receiving a portion of an outer container, each system engagement feature comprising a plurality of lines of weakening defining generally diamond-shaped oblique fold lines having a plurality of separably connected sections foldably connected to the at least one bottom panel, the plurality of lines of weakening further including a generally straight line of weakening extending from a first vertex of the generally diamond-shaped lines of weakening to a second vertex of the generally diamond-shaped lines of weakening.

2. The carrier of claim 1, wherein the respective generally straight line of weakening is bisected by an additional line of weakening.

3. The carrier of claim 2, wherein the at least one bottom panel is a first bottom panel foldably connected to a respective side panel of the plurality of side panels, and the plurality of panels further comprises a second bottom panel foldably connected to a respective side panel of the plurality of side panels and in at least partial face-to-face contact with the first bottom panel.

4. The carrier of claim 3, wherein the respective plurality of lines of weakening in the first bottom panel is a respective first plurality of lines of weakening, the respective plurality of separably connected sections in the first bottom panel is a respective first plurality of separably connected sections, the plurality of system engagement features further comprises second pluralities of lines of weakening in the second bottom panel defining a respective second plurality of separably connected sections.

5. The carrier of claim 4, wherein the respective second plurality of separably connected sections is in at least partial face-to-face contact with the respective first plurality of separably connected sections.

6. The carrier of claim 5, wherein the respective second plurality of lines of weakening comprises a plurality of oblique fold lines bisected by a generally straight fold line.

7. The carrier of claim 6, wherein the locking features comprise a plurality of locking tabs extending from the second bottom panel and a plurality of locking flaps separably connected to the first bottom panel, the locking tabs at least partially received between a respective locking flap and the first bottom panel.

8. The carrier of claim 7, wherein the plurality of locking flaps are bisected by the respective generally straight line of weakening in the first bottom panel.

9. The carrier of claim 8, wherein the plurality of locking tabs are bisected by the respective generally straight line of weakening in the second bottom panel.

10. The carrier of claim 3, wherein the plurality of side panels comprises a front side panel foldably connected to the first bottom panel and a back side panel foldably connected to the second bottom panel.

11. The carrier of claim 10, wherein the plurality of side panels further comprises at least one front end panel foldably connected to the front side panel and at least one back end panel foldably connected to the back end panel.

12. The carrier of claim 11, further comprising a front central panel foldably connected to the at least one front end panel and a back central panel foldably connected to the at least one back end panel, the front central panel and the back central panel positioned in at least partial face-to-face contact.

13. The carrier of claim 12, further comprising at least one front divider flap extending from the front central panel to the front side panel to form a plurality of front container-receiving spaces in the interior of the carrier and at least one back divider flap extending from the back central panel to the back side panel to form a plurality of back container-receiving spaces in the interior of the carrier.

14. The carrier of claim 3, wherein the plurality of panels further comprises a top panel and the plurality of side panels comprises at least one upper side panel foldably connected to the top panel and at least one lower side panel foldably connected to the at least one upper side panel.

15. The carrier of claim 14, wherein the at least one upper side panel is a first upper side panel foldably connected to the top panel, the at least one lower side panel is a first lower side panel foldably connected to the first upper side panel, and the plurality of side panels further comprises a second upper side panel foldably connected to the top panel and a second lower side panel foldably connected to the second upper side panel.

16. The carrier of claim 15, wherein the first bottom panel is foldably connected to the first lower side panel and the second bottom panel is foldably connected to the second lower side panel.

17. A blank for forming a carrier for holding a plurality of containers, the blank comprising:

a plurality of panels extending for at least partially around an interior of the carrier formed form the blank, the plurality of panels comprising a plurality of side panels and at least one bottom panel foldably connected to a respective panel of the plurality of panels;

locking features in the at least one bottom panel for at least partially maintaining a formed configuration of the carrier formed from the blank; and a plurality of system engagement features for at least partially receiving a portion of an outer container, each system engagement feature comprising a plurality of lines of weakening defining generally diamond-shaped oblique fold lines having a plurality of separably connected sections foldably connected to the at least one bottom panel, the plurality of lines of weakening further including a generally straight line of weakening extending from a first vertex of the generally diamond-shaped lines of weakening to a second vertex of the generally diamond-shaped lines of weakening.

18. The blank of claim 17, wherein the respective generally straight line of weakening is bisected by an additional line of weakening.

19. The blank of claim 18, wherein the at least one bottom panel is a first bottom panel foldably connected to a respective side panel of the plurality of side panels, and the plurality of panels further comprises a second bottom panel foldably connected to a respective side panel of the plurality of side panels for being positioned in at least partial face-to-face contact with the first bottom panel when the carrier is formed from the blank.

20. The blank of claim 19, wherein the respective plurality of lines of weakening in the first bottom panel is a respective first plurality of lines of weakening, the respective plurality of separably connected sections in the first bottom panel is a respective first plurality of separably connected sections, the plurality of system engagement features further comprises second pluralities of lines of weakening in the second bottom panel defining a respective second plurality of separably connected sections.

21. The blank of claim 20, wherein the respective second plurality of separably connected sections is for being positioned in at least partial face-to-face contact with the respective first plurality of separably connected sections when the carrier is formed from the blank.

22. The blank of claim 21, wherein the respective second plurality of lines of weakening comprises a plurality of oblique fold lines bisected by a generally straight fold line.

23. The blank of claim 22, wherein the locking features comprise a plurality of locking tabs extending from the second bottom panel and a plurality of locking flaps separably connected to the first bottom panel, the locking tabs for being at least partially received between a respective locking flap and the first bottom panel.

24. The blank of claim 23, wherein the plurality of locking flaps are bisected by the respective generally straight line of weakening in the first bottom panel.

25. The blank of claim 24, wherein the plurality of locking tabs are bisected by the respective generally straight line of weakening in the second bottom panel.

26. The blank of claim 19, wherein the plurality of side panels comprises a front side panel foldably connected to the first bottom panel and a back side panel foldably connected to the second bottom panel.

27. The blank of claim 26, wherein the plurality of side panels further comprises at least one front end panel foldably connected to the front side panel and at least one back end panel foldably connected to the back end panel.

28. The blank of claim 27, further comprising a front central panel foldably connected to the at least one front end panel and a back central panel foldably connected to the at least one back end panel, the front central panel and the back central panel for being positioned in at least partial face-to-face contact when the carrier is formed from the blank.

29. The blank of claim 28, further comprising at least one front divider flap and at least one back divider flap, the at least one front divider flap for being positioned extending from the front central panel to the front side panel to form a plurality of front container-receiving spaces in the interior of the carrier formed from the blank and at least one back divider flap for being positioned extending from the back central panel to the back side panel to form a plurality of back container-receiving spaces in the interior of the carrier formed from the blank.

30. The blank of claim 19, wherein the plurality of panels further comprises a top panel and the plurality of side panels comprises at least one upper side panel foldably connected to the top panel and at least one lower side panel foldably connected to the at least one upper side panel.

31. The blank of claim 30, wherein the at least one upper side panel is a first upper side panel foldably connected to the top panel, the at least one lower side panel is a first lower side panel foldably connected to the first upper side panel, and the plurality of side panels further comprises a second upper side panel foldably connected to the top panel and a second lower side panel foldably connected to the second upper side panel.

32. The blank of claim 31, wherein the first bottom panel is foldably connected to the first lower side panel and the second bottom panel is foldably connected to the second lower side panel.

33. A method of forming a carrier for holding a plurality of containers, the method comprising:

obtaining a blank, the blank comprising a plurality of panels comprising a plurality of side panels and at least one bottom panel foldably connected to a respective panel of the plurality of panels, locking features in the at least one bottom panel, and a plurality of system engagement features, each system engagement feature comprising a plurality of lines of weakening defining generally diamond-shaped oblique fold lines having a plurality of separably connected sections foldably connected to the at least one bottom panel, the plurality of lines of weakening further including a generally straight line of weakening extending from a first vertex of the generally diamond-shaped lines of weakening to a second vertex of the generally diamond-shaped lines of weakening; and positioning the plurality of side panels extending at least partially around an interior of the carrier; and positioning the at least one bottom panel such that the locking features at least partially maintain a formed configuration of the carrier and such that the plurality of system engagement features are positioned for at least partially receiving a portion of an outer container.

34. The method of claim 33, wherein the respective generally straight line of weakening is bisected by an additional line of weakening.

35. The method of claim 34, wherein the at least one bottom panel is a first bottom panel foldably connected to a respective side panel of the plurality of side panels, and the plurality of panels further comprises a second bottom panel foldably connected to a respective side panel of the plurality of side panels and in at least partial face-to-face contact with the first bottom panel.

36. The method of claim 35, wherein the respective plurality of lines of weakening in the first bottom panel is a respective first plurality of lines of weakening, the respective plurality of separably connected sections in the first bottom panel is a respective first plurality of separably connected sections, the plurality of system engagement features further comprises second pluralities of lines of weakening in the second bottom panel defining a respective second plurality of separably connected sections.

37. The method of claim 36, further comprising positioning the respective second plurality of separably connected sections in at least partial face-to-face contact with the respective first plurality of separably connected sections.

38. The method of claim 37, wherein the respective second plurality of lines of weakening comprises a plurality of oblique fold lines bisected by a generally straight fold line.

39. The method of claim 38, wherein the locking features comprise a plurality of locking tabs extending from the second bottom panel and a plurality of locking flaps separably connected to the first bottom panel, and the method further comprises positioning the locking tabs at least partially between a respective locking flap and the first bottom panel.

40. The method of claim 39, wherein the plurality of locking flaps are bisected by the respective generally straight line of weakening in the first bottom panel.

41. The method of claim 40, wherein the plurality of locking tabs are bisected by the respective generally straight line of weakening in the second bottom panel.

42. The method of claim 35, wherein the plurality of side panels comprises a front side panel foldably connected to the first bottom panel and a back side panel foldably connected to the second bottom panel.

43. The method of claim 42, wherein the plurality of side panels further comprises at least one front end panel foldably connected to the front side panel and at least one back end panel foldably connected to the back end panel.

44. The method of claim 43, wherein the plurality of panels further comprises a front central panel foldably connected to the at least one front end panel and a back central panel foldably connected to the at least one back end panel, and the method further comprises positioning the front central panel and the back central panel positioned in at least partial face-to-face contact.

45. The method of claim 44, wherein the blank further comprises at least one front divider flap and at least one back divider flap, and the method further comprises positioning the at least one front divider flap extending from the front central panel to the front side panel to form a plurality of front container-receiving spaces in the interior of the carrier, and the method further comprises positioning the at least one back divider flap extending from the back central panel to the back side panel to form a plurality of back container-receiving spaces in the interior of the carrier.

46. The method of claim 35, wherein the plurality of panels further comprises a top panel and the plurality of side panels comprises at least one upper side panel foldably connected to the top panel and at least one lower side panel foldably connected to the at least one upper side panel.

47. The method of claim 46, wherein the at least one upper side panel is a first upper side panel foldably connected to the top panel, the at least one lower side panel is a first lower side panel foldably connected to the first upper side panel, and the plurality of side panels further comprises a second upper side panel foldably connected to the top panel and a second lower side panel foldably connected to the second upper side panel.

48. The method of claim 47, wherein the first bottom panel is foldably connected to the first lower side panel and the second bottom panel is foldably connected to the second lower side panel.

49. The method of claim 35, further comprising positioning the carrier in the interior of an outer container such that the system engagement features at least partially receive a post extending from the outer container.

50. A system, the system comprising:

an outer container comprising a bottom wall, a plurality of sidewalls extending upwardly from the bottom and at least partially around an interior of the outer container, and a plurality of posts extending upwardly from the bottom wall; and a carrier for holding a plurality of containers, the carrier comprising:

a plurality of panels extending at least partially around an interior of the carrier, the plurality of panels comprising a plurality of side panels and at least one bottom panel foldably connected to a respective panel of the plurality of panels;

locking features in the at least one bottom panel for at least partially maintaining a formed configuration of the carrier; and a plurality of system engagement features at least partially receiving a respective post of the outer container, each system engagement feature comprising a plurality of lines of weakening defining generally diamond-shaped oblique fold lines having a plurality of separably connected sections foldably connected to the at least one bottom panel, the plurality of lines of weakening further including a generally straight line of weakening extending from a first vertex of the generally diamond-shaped lines of weakening to a second vertex of the generally diamond-shaped lines of weakening.

51. The system of claim 50, wherein the respective generally straight line of weakening is bisected by an additional line of weakening.

52. The system of claim 51, wherein the at least one bottom panel is a first bottom panel foldably connected to a respective side panel of the plurality of side panels, and the plurality of panels further comprises a second bottom panel foldably connected to a respective side panel of the plurality of side panels and in at least partial face-to-face contact with the first bottom panel.

53. The system of claim 52, wherein the respective plurality of lines of weakening in the first bottom panel is a respective first plurality of lines of weakening, the respective plurality of separably connected sections in the first bottom panel is a respective first plurality of separably connected sections, the plurality of system engagement features further comprises second pluralities of lines of weakening in the second bottom panel defining a respective second plurality of separably connected sections.

54. The system of claim 53, wherein the respective second plurality of separably connected sections is in at least partial face-to-face contact with the respective first plurality of separably connected sections.

55. The system of claim 54, wherein the respective second plurality of lines of weakening comprises a plurality of oblique fold lines bisected by a generally straight fold line.

56. The system of claim 55, wherein the locking features comprise a plurality of locking tabs extending from the second bottom panel and a plurality of locking flaps separably connected to the first bottom panel, the locking tabs at least partially received between a respective locking flap and the first bottom panel.

57. The system of claim 56, wherein the plurality of locking flaps are bisected by the respective generally straight line of weakening in the first bottom panel.

58. The system of claim 57, wherein the plurality of locking tabs are bisected by the respective generally straight line of weakening in the second bottom panel.

59. The system of claim 52, wherein the plurality of side panels comprises a front side panel foldably connected to the first bottom panel and a back side panel foldably connected to the second bottom panel.

60. The system of claim 59, wherein the plurality of side panels further comprises at least one front end panel foldably connected to the front side panel and at least one back end panel foldably connected to the back end panel.

61. The system of claim 60, further comprising a front central panel foldably connected to the at least one front end panel and a back central panel foldably connected to the at least one back end panel, the front central panel and the back central panel positioned in at least partial face-to-face contact.

62. The system of claim 61, further comprising at least one front divider flap extending from the front central panel to the front side panel to form a plurality of front container-receiving spaces in the interior of the carrier and at least one back divider flap extending from the back central panel to the back side panel to form a plurality of back container-receiving spaces in the interior of the carrier.

63. The system of claim 52, wherein the plurality of panels further comprises a top panel and the plurality of side panels comprises at least one upper side panel foldably connected to the top panel and at least one lower side panel foldably connected to the at least one upper side panel.

64. The system of claim 63, wherein the at least one upper side panel is a first upper side panel foldably connected to the top panel, the at least one lower side panel is a first lower side panel foldably connected to the first upper side panel, and the plurality of side panels further comprises a second upper side panel foldably connected to the top panel and a second lower side panel foldably connected to the second upper side panel.

65. The system of claim 64, wherein the first bottom panel is foldably connected to the first lower side panel and the second bottom panel is foldably connected to the second lower side panel.

* * * * *